US010938593B2

(12) United States Patent
McLaughlin et al.

(10) Patent No.: US 10,938,593 B2
(45) Date of Patent: Mar. 2, 2021

(54) ANOMALY DETECTION BY RESIDENT DEVICE

(71) Applicant: Apple Inc., Cupertino, CA (US)

(72) Inventors: Kevin P. McLaughlin, Waikoloa, HI (US); Serhat S. Bucak, Santa Clara, CA (US); Sumit Saxena, Sunnyvale, CA (US); Anush Nadathur, San Jose, CA (US); Arun Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 15/275,344

(22) Filed: Sep. 24, 2016

(65) Prior Publication Data

US 2018/0091327 A1    Mar. 29, 2018

(51) Int. Cl.
| | | |
|---|---|---|
| *G06F 15/173* | (2006.01) | |
| *H04L 12/28* | (2006.01) | |
| *H04L 29/08* | (2006.01) | |
| *H04L 12/46* | (2006.01) | |

(52) U.S. Cl.
CPC ...... *H04L 12/2823* (2013.01); *H04L 12/4625* (2013.01); *H04L 12/4633* (2013.01); *H04L 67/12* (2013.01); *H04L 67/22* (2013.01); *H04L 67/26* (2013.01)

(58) Field of Classification Search
CPC ............ H04L 12/2823; H04L 12/4625; H04L 12/4633; H04L 67/12; H04L 67/22; H04L 67/26
USPC ....................................................... 709/224
See application file for complete search history.

(56) References Cited

U.S. PATENT DOCUMENTS

| 8,973,133 B1* | 3/2015 | Cooley | G06F 21/50 726/22 |
|---|---|---|---|
| 2013/0305357 A1* | 11/2013 | Ayyagari | H04W 12/06 726/22 |
| 2016/0139575 A1* | 5/2016 | Funes | H04L 12/2834 700/275 |
| 2016/0179087 A1* | 6/2016 | Lee | G01C 21/3664 700/9 |
| 2016/0205123 A1* | 7/2016 | Almurayh | H04L 63/1425 726/23 |
| 2017/0006348 A1* | 1/2017 | Hardt | H04N 21/40 |
| 2017/0116059 A1* | 4/2017 | Wolf | G06F 11/079 |
| 2017/0155560 A1* | 6/2017 | Lee | H04L 41/5009 |

* cited by examiner

*Primary Examiner* — Hannah S Wang
(74) *Attorney, Agent, or Firm* — Kilpatrick, Townsend & Stockton

(57) ABSTRACT

In some implementations, a user device (or resident device) can notify the user of anomalous accessory states. For example, the user device can determine which accessory states and contexts represent normal accessory states in the respective contexts. Similarly to scene suggestions, the user device can analyze historical accessory state data and context data to determine an accessory state pattern that indicates a normal state of an accessory for a given context. The user device can compare the current state and/or context of an accessory to historical accessory state data to determine when the current state of the accessory is abnormal for the current context. If the current accessory state is abnormal for the current context, the user device can present a notification to the user informing the user of the anomalous accessory state.

16 Claims, 15 Drawing Sheets

ANOMALY DETECTION BY RESIDENT DEVICE

TECHNICAL FIELD

The disclosure generally relates to controlling remote accessory devices using a computing device.

BACKGROUND

Home automation is becoming more and more popular. Starting with home clothes and dish washing machines years ago to the smart (e.g., computerized) fixtures, appliances, and accessories we have today, more and more people are automating their homes. With the increasing availability of smart accessories and appliances comes more ways to control these smart devices. For example, a software application on a user's mobile device can be configured to control individual accessories, appliances, and/or fixtures in the user's home or office. However, as accessories get smarter, they also provide a more varied feature set which makes controlling these devices more and more complicated for the user.

SUMMARY

In some implementations, a user device can automatically generate scene suggestions and/or trigger suggestions. For example, a scene can be a collection of accessories and corresponding accessory states. When the scene is invoked, the user device can cause the accessories associated with the scene to assume the corresponding accessory states. The user device can automatically determine the accessories and/or corresponding accessory states for a scene based on historical patterns of use represented in historical accessory state data. The user device can automatically determine triggers for automatically invoking scenes based on historical patterns of use. For example, the user device can analyze historical context (e.g., location, time, accessory state, etc.) data associated with accessory state transitions to determine triggers for automatically invoking a scene. The user device can present suggest scenes and/or triggers to the user of the user device.

In some implementations, a resident device can automatically generate scene suggestions and/or trigger suggestions based on historical data aggregated from multiple user devices. For example, a resident device can be a user device that is (e.g., mostly) kept in the home environment. Therefore, the resident device is able to collect accessory state and/or context data when another user device may not be connected to the accessories in the home environment. Moreover, the resident device can collect and/or aggregate accessory state data, context data, and user device state data from across multiple user devices. The resident device can automatically determine the accessories and/or corresponding accessory states for a scene based on historical patterns of use represented in the aggregated historical accessory state data. The user device can automatically determine triggers for automatically invoking scenes based on historical patterns of use. The user device can present suggest scenes and/or triggers to the user of the user device.

In some implementations, a user device (or resident device) can notify the user of anomalous accessory states. For example, the user device can determine which accessory states and contexts represent normal accessory states in the respective contexts. Similarly to scene suggestions, the user device can analyze historical accessory state data and context data to determine an accessory state pattern that indicates a normal state of an accessory for a given context. The user device can compare the current state and/or context of an accessory to historical accessory state data to determine when the current state of the accessory is abnormal for the current context. If the current accessory state is abnormal for the current context, the user device can present a notification to the user informing the user of the anomalous accessory state.

Particular implementations provide at least the following advantages. Scene suggestions can be automatically generated that allow the user to recreate an environment (e.g., accessory states) with a single input. Scene trigger suggestions can be automatically generated that allow the user to configure the user device to automatically recreate an environment (e.g., accessory states) based on a detected context. The user device can automatically detect anomalous accessory states and notify the user of accessory states that might be dangerous or harmful to the user and/or the user's property.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Example Environment

Figure 1:
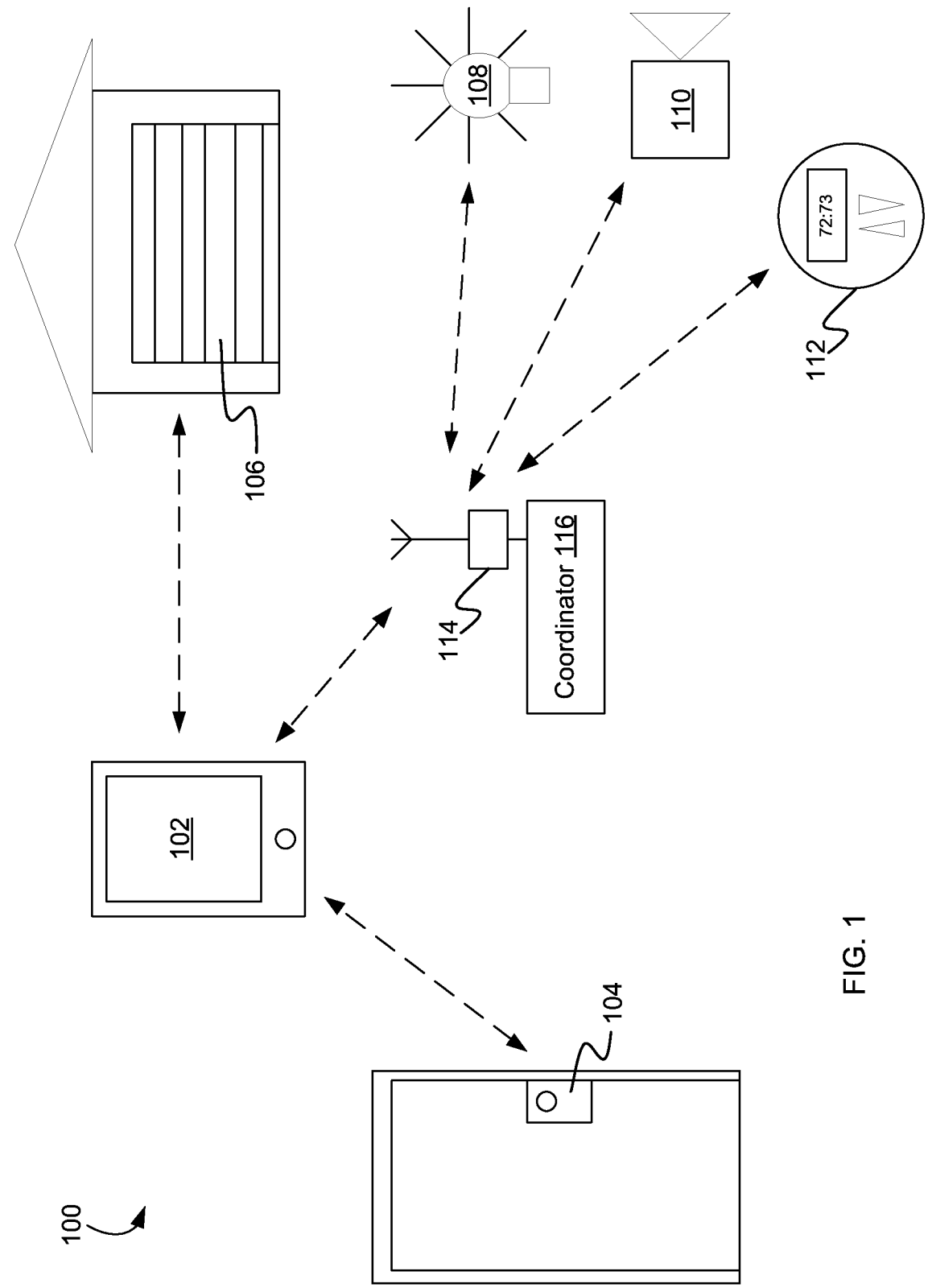
FIG. 1 shows an example home environment.

FIG. 1 shows an example home environment 100. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). Another type of intermediary can be coordinator 116, which, in addition to operating as a controller, can relay messages between other controllers and accessories. In some embodiments, coordinator 116 can also implement various control logic to automate or optimize interactions with accessories; examples are described below.

Various communication transports and combinations of transports can be used, and different transports can be used with different devices. For example, some wireless transports such as the Bluetooth® Classic or Bluetooth® Smart communication and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileges can be configured and controlled, for example, using techniques described below, and in above-referenced U.S. application Ser. No. 14/725,891.

In some embodiments, a uniform accessory protocol can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

In some embodiments, controllers (or their users) can be assigned various permissions or privileges in regard to the accessories. For example, an administrator (or "admin") privilege may be a highest level of privilege, and a controller with admin privileges may establish pairings with accessories and control any controllable characteristic of the accessory state. In some embodiments, admin privilege may be granted to the first controller to perform pair setup with a particular accessory, and after the admin controller performs pair setup, the accessory can decline to perform pair setup with any other controllers; instead, the admin controller can grant access to other controllers (or other users) by performing pair add. In some embodiments, the admin controller can specify privileges for each added controller (including admin privileges).

It will be appreciated that home environment 100 is illustrative and that variations and modifications are possible. Embodiments described herein can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive notifications of updates to) the service and/or its characteristics. Accordingly, protocols and communication processes used in embodiments of the technology described herein can be uniformly applied in any context with one or more controllers and one or more accessories, regardless of accessory function or controller form factor or specific interfaces.

Figure 2:
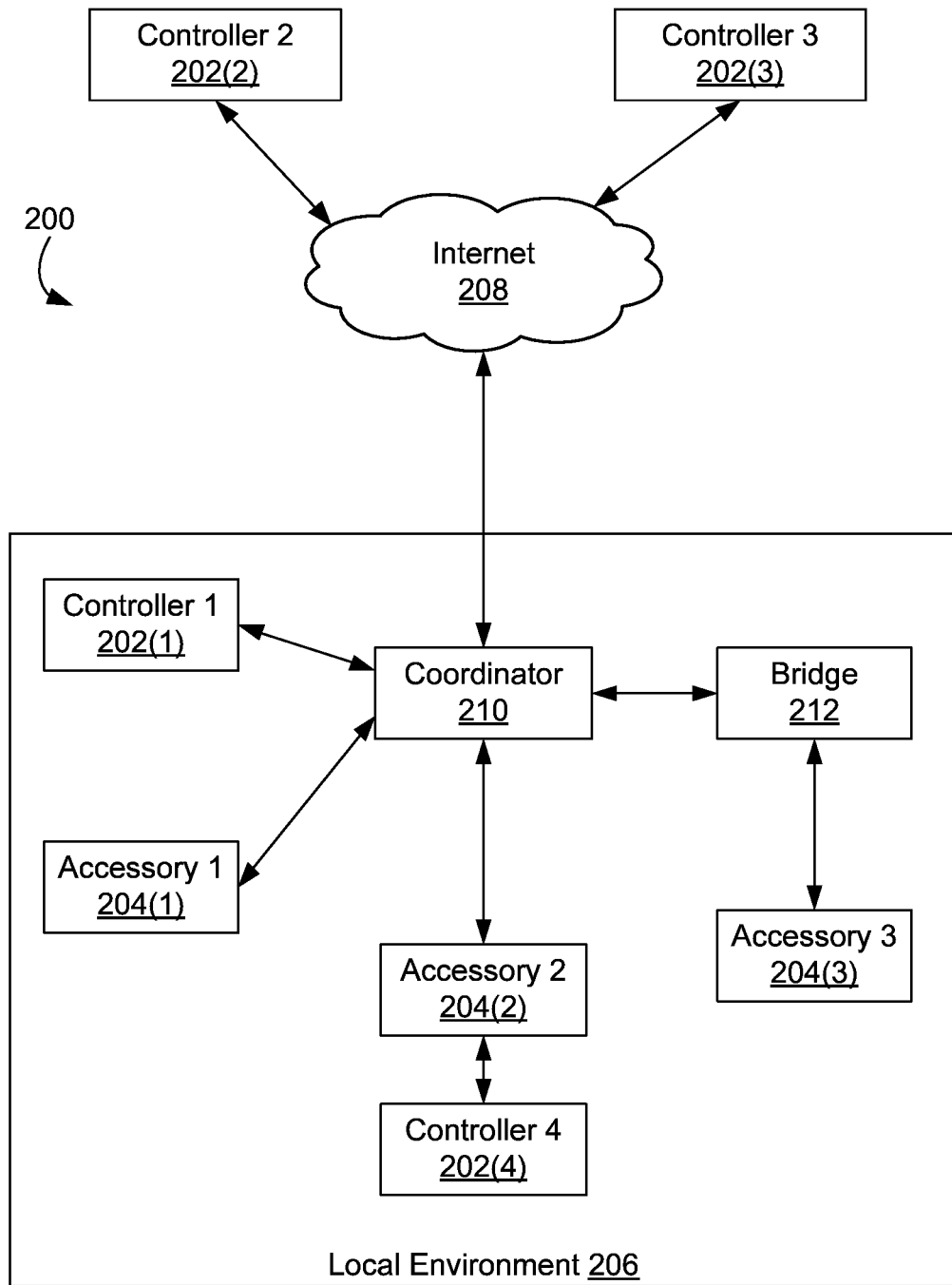
FIG. 2 shows an example network configuration.

FIG. 2 shows an example network configuration 200. Configuration 200 allows controllers 202 to communicate with accessories 204 located in local environment 206 (e.g., a home environment) via a coordinator 210. Each controller 202 can be an electronic device owned and/or operated by a user who frequents environment 206 (e.g., a resident of the home or a regular visitor to the home). For example, controller 202 can be resident device (e.g., a desktop computer, tablet computer, streaming media device, etc.) that typically stays within (e.g., resides in) local environment 206. Controllers 202 can each be similar to controller 102 of FIG. 1, and accessories 204 can be similar to various accessories shown in FIG. 1.

Accessories 204 can each communicate with a coordinator device (or "coordinator") 210 that can be located with local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can include any device that is capable of presenting itself as a controller to accessories 204 and that is capable of communicating securely with controllers 202. In some embodiments, coordinator 210 can present itself to accessories 204 as a controller and to controllers 202 as an accessory that provides services for communicating with other accessories (e.g., accessories 204); examples are described in U.S. application Ser. No. 14/725,891. In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a desktop computer, a Wi-Fi or access-point unit, a dedicated accessory-control base station, a set-top box for a television or other appliance (which can implement coordinator functionality in addition to interacting with the television or other appliance), or any other electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208 (although they can be if desired). In some embodiments, coordinator 210 can be connected to communication network 208 and can facilitate access to accessories 204 by remote controllers 202(2) and 202(3).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "bridge" 212. Bridge 212 can operate to relay commands between a controller and an accessory; in some embodiments, bridge 212 and/or coordinator 210 can also translate between different communication protocols used by coordinator 210 or controller 202 and accessory 204(3). Further, in some embodiments, bridge 212 can be implemented as a "tunnel" that can provide secure end-to-end communication between coordinator 210 and accessory 204(3). Examples of proxies, bridges, and tunnels are described in above-referenced U.S. application Ser. No. 14/725,891.

In some implementations of network configuration 200, controllers 202 can be configured to communicate with accessories 204 via coordinator 210 whenever possible. Thus, as shown, controller 202(1), which is in local environment 206, communicates with coordinator 210 rather than directly with accessories 204, as do remotely located controllers 202(2) and 202(3). Direct communication between any of controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2).

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210, and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 210 can present itself as an accessory when communicating with a controller (e.g., any of controllers 202) and as a controller when communicating with an accessory (e.g., accessory 204).

Coordinator 210 can facilitate operation of an accessory network including accessories 204. For example, coordinator 210 can maintain an environment model for the accessory network and can provide the model (or portions thereof) to various controllers 202; examples of an environment model are described below. Controllers 202 can operate accessories 204 by interacting with coordinator 210.

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210, and in some embodiments, accessories 204 can be configured to communicate directly only with coordinator 210 and to ignore requests that come directly from controllers 202. This can allow coordinator 210 to enforce permissions and other restrictions on access to accessories 204.

Centralizing communication with accessories through coordinator 210 can simplify management of a controller network and/or accessory network (e.g., controllers 202 and accessories 204 in local environment 206). For example, if a new accessory is acquired, the new accessory need only establish a pairing with coordinator 210 in order to allow all controllers 202 to have access to the new accessory. Similarly, if a new controller 202 is acquired, the new controller 202 need only establish a pairing with coordinator 210 to allow the new controller to have access to all accessories 204. In an environment with multiple controllers (e.g., a family where the members each have multiple devices) and perhaps dozens of accessories, the time saving can be considerable.

It should be noted that in configuration 200, it is possible that one or more of the controllers (e.g., controller 202(1)) can be permitted to communicate with one or more accessories (e.g., accessory 204(1)) indirectly (via coordinator 210) but not directly, regardless of whether controller 202(1) is in local environment 206. This might occur, for instance, if controller 202(1) has established a pairing with coordinator 210 but not directly with accessory 204(1). In some instances, this can provide enhanced security; for instance, an accessory that has a pairing established with coordinator 210 can refuse to establish any other pairings. However, there may be cases where direct access is desirable, and establishing a direct pairing between a certain accessory, e.g., accessory 204(1) and one or more controllers 202 can be permitted. For example, suppose that accessory 204(1) is a door lock and controller 202(1) is a mobile phone. If a direct pairing between accessory 204(1) and controller 202 (1) is established, a user can use controller 202(1) to lock or unlock accessory 204(1) via direct communication, thereby locking or unlocking the door. This can be useful, e.g., in the event that coordinator 210 is temporarily unavailable. In some embodiments, coordinator 210 can be used to indicate to accessory 204(1) which of controllers 202 are authorized for direct access, and accessory 204(1) can establish pairings with authorized controllers 202. In some embodiments, accessory 204(1) can be configured to accept direct communication from an authorized controller 202 only when coordinator 210 is not available. Thus, the general rule can be that all communications with accessory 204 go through coordinator 210, with exceptions made on a per-accessory and per-controller basis.

Coordinator 210 can operate as an intelligent agent for allowing controllers to operate accessories, rather than simply relaying messages. For example, coordinator 210 can establish a pairing with each of controllers 202 and a pairing with each accessory 204. When controller 202(1), for example, receives a user request to interact with a specific accessory, e.g., accessory 204(1), controller 202(1) can establish a first pair-verified session with coordinator 210 and provide its instructions for accessory 204 to coordinator 210 via the first pair-verified session. Coordinator 210 can receive the instructions, establish a second pair-verified session with accessory 204 and send appropriate control messages to accessory 204 via the second pair-verified session. In some embodiments, coordinator 210 can be privy to the content of the instructions, and in some embodiments, the messages sent to accessory 204 need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204 to coordinator 210. Coordinator 210 can analyze the received instructions, e.g., to detect and resolve conflicts such as where controller 202(1) instructs coordinator 210 to turn accessory 204 on while controller 202(2) instructs coordinator 210 to turn accessory 204 off. Coordinator 210 can be programmed with priority rules or other rules for resolving conflicts (e.g., "on" takes priority over "off"; instructions from a controller with admin privilege take precedence over instructions from a controller without admin privilege; etc.). Coordinator 210 can apply the priority rules to resolve any conflicts and can communicate instructions to accessory 204 based on the resolution. When a response is received from accessory 204, coordinator 210 can determine whether to send a corresponding message (or a different message) to controller 202(1) and/or to controller 202(2).

As another example, coordinator 210 can enforce permissions established for various controllers 202 and/or accessories 204. For example, when one of controllers 202 sends a request, coordinator 210 can apply decision logic to determine whether the controller 202 that sent the request has appropriate permission; if not, coordinator 210 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 210 is not limited to acting as a passive relay for messages between controllers and accessories but can actively intervene to resolve conflicting instructions, enforce any limitations that may exist on the privileges or permissions granted to particular controllers or users, and so on.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202.

As noted above, coordinator 210 can be particularly useful in the context of an automated environment with a number of accessories that can be controlled. Examples include homes, cars or other vehicles, office buildings, campuses having multiple buildings, etc. For purposes of illustration, an example of an accessory network implementation for a home will be described; those skilled in the art with access to the present disclosure will understand that similar accessory networks can be implemented in other automated environments.

In one example of an accessory network, each accessory is connected to one or more controllers, and accessories can be controlled by sending messages, e.g., as described in above-referenced U.S. application Ser. No. 14/725,912 and U.S. application Ser. No. 14/614,914. This can be perfectly serviceable for small networks with just a few accessories. However, in some instances, particularly as the number of accessories increases, it can be helpful to establish meaningful (to a user) groups of accessories that can be managed in a coordinated fashion. Accordingly, certain embodiments of the present technologies described herein incorporate environment models usable to coordinate control across multiple accessories in an accessory network.

As used herein, an environment model can provide various logical groupings of the accessories in an environment. For example, a home environment can be modeled by defining "rooms" that can represent rooms in the home (e.g., kitchen, living room, master bedroom, etc.). In some cases, a room in the model need not correspond to a room in the home; for instance, there can be a "front yard" room or an "anywhere" room (which can be used to refer to accessories that are present in the home but whose location within the home is subject to change or has not been defined as a room). Each accessory in the home can be assigned to a room in the environment model, e.g., based on the actual physical location of the accessory. Rooms can be grouped into zones based on physical and/or logical similarities. For instance, an environment model for a two-level house might have an "upstairs" zone and a "downstairs" zone. As another example, an environment model might have a "bedrooms" zone that includes all bedrooms regardless of where they are located. The model can be as simple or complex as desired, e.g., depending on the size and complexity of the environment.

Where an environment model is defined, accessories represented in the environment model can be controlled individually or at the level of rooms, zones, or the whole model. For instance, a user can instruct a controller or coordinator to turn on all the outside lights or to turn off all accessories in a specific room.

Other groupings of accessories can also be defined. For example, in some embodiments, a user can augment an environment model by grouping various accessories into "service groups" that can include any set of accessories the user may desire to control together, at least some of the time. A service group can include accessories in any combination of rooms or zones, and the accessories in a service group can be homogeneous (e.g., all upstairs lights) or heterogeneous (e.g., a light, a fan, and a TV). In some embodiments, a user can provide a single instruction to a controller to set the state of an entire service group (e.g., turn the group on or off). While not required, the use of service groups can provide another degree of flexibility in coordinating control over multiple accessories.

In some embodiments, the environment model for a given environment can be represented as a data object (or set of data objects). The environment model can be created on a controller associated with the environment (e.g., a controller with admin privileges) and can be shared with other controllers through a synchronization operation. For instance, controllers 202 of FIG. 2 can synchronize with a "master" copy of the environment model maintained by coordinator 210 (which can receive updates from controllers 202), or cloud-based synchronization (in which the master copy is stored in a location accessible via network 208 and automatically synchronized with the controllers and coordinator(s) associated with the environment) can be used.

Accordingly, all controllers and coordinators associated with a given environment can have shared access to the same environment model.

Additional examples related to defining and using an environment model are described in above-referenced U.S. application Ser. No. 14/725,912. It is to be understood that an environment model is not required to make use of at least some of the features described below.

Figure 3:
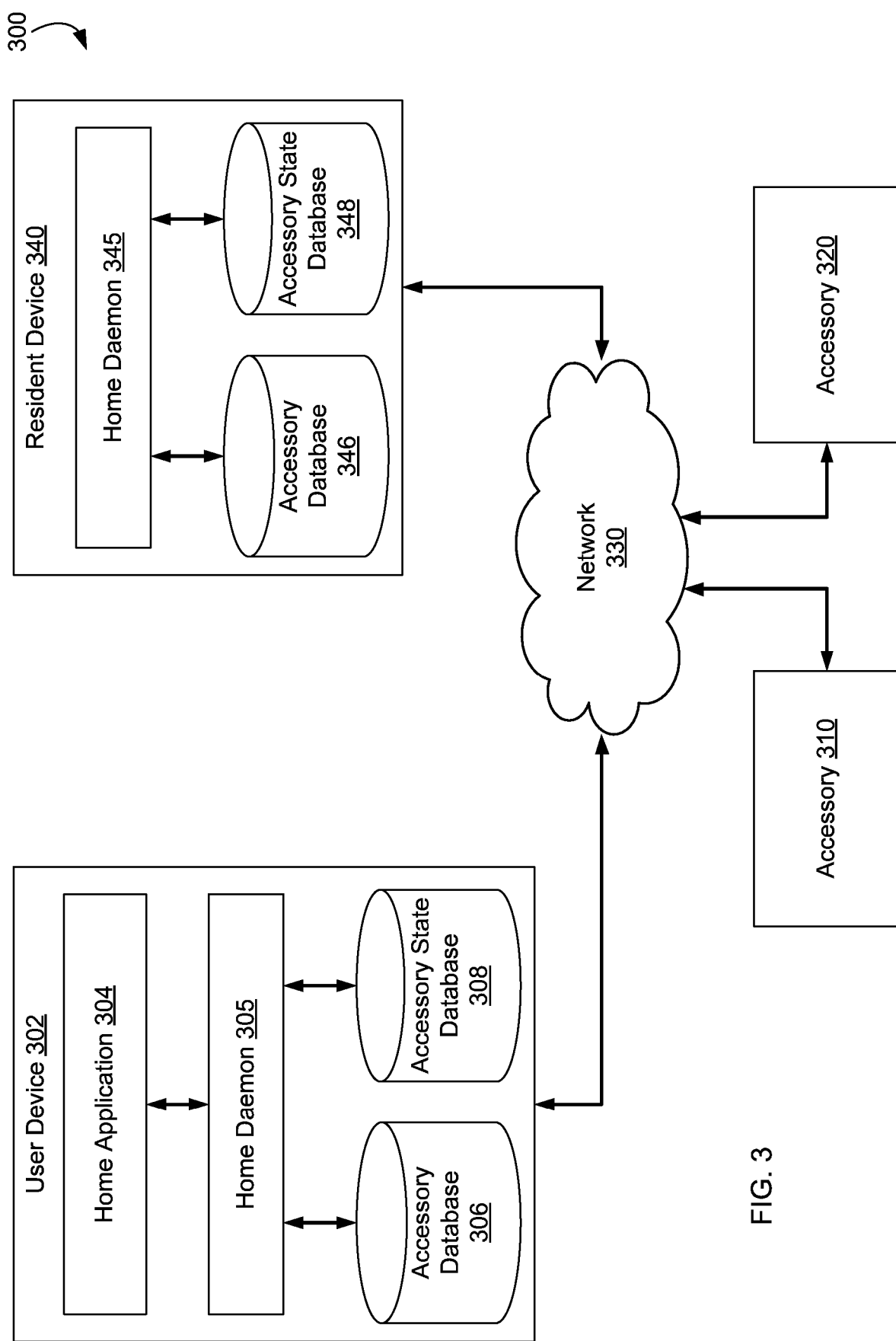
FIG. 3 is a block diagram of an example system for managing accessories.

FIG. 3 is a block diagram of an example system 300 for managing accessories. In some implementations, system 300 can include user device 302. User device 302 can, for example, correspond to one of controllers 202 (e.g., controller 202(1), controller 202(2), etc.), as described above with reference to FIG. 2. User device 302 can correspond to coordinator 210 (e.g., coordinator 116), as described above with reference to FIG. 2. For example, user device 302 can be a computing device, such as a laptop computer, tablet computer, smartphone, or wearable device (e.g., a smartwatch, smart glasses, smart clothing, etc.). User device 302 can be a computing device, such as a desktop computer, streaming media device, home media server, router, or other computing device.

In some implementations, user device 302 can include home application 304. For example, home application 304 can be a standalone user application or a system application (e.g., tightly integrated with or part of the operating system) of user device 302. Home application 304 can provide graphical user interfaces and other user accessible features that allow the user to interact with, manage, and/or control networked accessory devices within a home environment, as described further herein below.

In some implementations, home application 304 can be configured to manage and control accessories and accessory states. For example, when a user installs or configures an accessory (e.g., accessory 310, accessory 320) in the user's home, the smart accessory can broadcast a message (e.g., a Bluetooth signal) advertising the existence of the smart accessory. Home application 304 can receive the broadcast message and add the smart accessory to the accessories managed by home application 304. For example, home application 304 can receive state information from individual accessories (e.g., accessory 310, accessory 320, etc.) through network 330 (e.g., a WAN, LAN, WLAN, peer-to-peer Wi-Fi, Bluetooth, etc.) and present the state information to the user on a display of user device 302. Home application 304 can send commands (e.g., automatically and/or in response to user input) to change the current state of the individual accessories through network 330. Thus, home application 304 can turn on and off smart lights, lock and unlock smart locks, turn on and off cameras, receive alarms from smoke detectors, and manage other smart accessories and appliances throughout the user's home.

In some implementations, home application 304 can manage groups of accessories. For example, when managing a home environment, home application 304 can group accessories (e.g., accessory 310 and accessory 320, etc.) according to the rooms in the house where the accessories are located, as described above. Thus, a user can interact with home application 304 to control all of the accessories in a room as a group. For example, a single user input to home application 304 can cause home application 304 to send a command to each accessory (e.g., accessory 310, accessory 320, etc.) in an accessory group (e.g., service group) through network 330 to change the current state (e.g., turn on, turn off) of all of the accessories assigned to a room.

In some implementations, home application 304 can group accessories based on function, classification, or category. For example, accessories related to external security (e.g. external lights, door locks, etc.) can be grouped together even though the accessories are not located in the same room. In some implementations, these service groups can be generated by home application 304 in response to user input assigning accessories to specific groups (e.g., to rooms, to functional categories, etc.). For example, the user can apply labels (e.g., room names, categories, etc.) to accessories and home application 304 can assign the accessories to service groups based on a set of rules for processing the labels assigned to the accessories. In some implementations, home application 304 can automatically group accessories according to various criteria, as described further below. In some implementations, home application 304 can group accessories based on a user-defined grouping. In some implementations, home application 304 can group accessories based on related uses. For example, home application 304 can learn, based on historical accessory state change data, which accessories the user typically uses together and/or what settings or states the user specifies for the accessories and generate service groups, scenes, and/or triggers and/or determine anomalous accessory states based on the learned user behavior, as described in detail below.

In some implementations, user device 302 can include home daemon 305. For example, home daemon 305 can be a daemon or background process running on user device 302 that monitors the state of various accessories and/or coordinates communication between accessories and other user devices (e.g., other home applications), as described above and below. In some implementations, home daemon 305 can be configured to collect state information, configuration information, and/or feature information from various smart accessories and store the accessory information in the appropriate databases (e.g., accessory database 306, accessory state database 308, etc.). When home application 304 requires accessory information (e.g., state information, configuration information, feature information, accessory control information, etc.) for accessories managed by home application 304, home application 304 can request the accessory information from home daemon 305 and home daemon 305 can obtain the information from the appropriate databases (e.g., accessory database 306, accessory state database 308, etc.) as described below. In some implementations, home daemon 305 can include some or all of the features of home application 304. For example, home daemon 305 can learn, based on historical accessory state change data, which accessories the user typically uses together and/or what settings or states the user specifies for the accessories and generate service groups, scenes, and/or triggers and/or determine anomalous accessory states based on the learned user behavior, as described in detail below.

While many of the features disclosed herein are described as features of home application 304, the same or similar features can be performed by home daemon 305. For example, analysis of historical data, generation of new scenes, service groups, and other machine learning activities can be performed by home daemon 305. Home daemon 305 can then deliver the results of such analysis (e.g., new scenes, service groups, etc.) to home application 304 (e.g., on the same device, on a different device, etc.) for presentation to the user.

In some implementations, when user device 302 is configured as a controller (e.g., controller 202(1), controller 202(2)), user device 302 can include home application 304, home daemon 305, accessory database 306, and/or accessory state database 306. When user device 302 is configured as a coordinator (e.g., coordinator 116, coordinator 210), user device 302 may include a reduced feature set and include home daemon 305, accessory database 306 and/or accessory state database 308. As described above, as a controller, user device 302 can act as both controller and coordinator using home application 304 and home daemon 305.

In some implementations, system 300 can include accessory 310. For example, accessory 310 can correspond to one of accessories 204 (e.g., accessory 204(1)) of FIG. 2. As described above, accessory 310 can include logic (e.g., software) and hardware (e.g., integrated circuits, radio frequency transmitters, memory, etc.) that cause accessory 310 to determine its current state and report its current state to user device 302 through network 330. Accessory 310 can include logic and hardware that cause accessory 310 to receive commands from user device 302 through network 330 that cause accessory 310 to change its current state (e.g., turn on/off, adjust volume, change speed, etc.). For example, accessory 310 can include lights, locks, doorbells, appliances, smoke detectors, carbon monoxide detectors, motion detectors, blinds, garage door openers, and/or other electrical devices, appliances, etc., that might be in a home, workplace, or other environment.

In some implementations, system 300 can include accessory 320. For example, accessory 310 can correspond to one of accessories 204 (e.g., accessory 204(2)) of FIG. 2. For example, accessory 320 can include the same or similar features as accessory 310. Accessory 320 can, for example, be the same type of device as accessory 310. Accessory 320 can be a different type of device (e.g., a fan vs. a light) and have different features (e.g., fan speed vs. light color) than accessory 310. However, both accessory 310 and accessory 320 can be smart accessories that can communicate with and be managed by home application 304.

In some implementations, user device 302 can include accessory database 306. For example, accessory database 306 can include accessory configuration information for accessories (e.g., accessory 310, accessory 320) managed by user device 302. Home application 304 and/or home daemon 305 can, for example, obtain accessory configuration information (e.g., features, APIs, controls, commands, etc.) from accessory 310 when home application 304 and/or home daemon 305 connects to accessory 310 through network 330. For example, accessory 310 can send its configuration information to home application 304 upon establishing a connection to home application 304 and/or home daemon 305 through network 330. Accessory 310 can send its configuration information to home application 304 and/or home daemon 305 in response to a request for configuration information from home application 304 and/or home daemon 305.

In some implementations, system 300 can include resident device 340. For example, resident device 340 can have the same or similar features as user device 302. For example, resident device 340 can include home daemon 345 corresponding to home daemon 305, accessory database 346 corresponding to accessory database 306, and/or accessory state database 348 corresponding to accessory state database 308. For example, resident device 340 can be a user device (e.g., desktop computer, laptop computer, streaming media device, set top box, etc.) that is typically kept within a home environment. Because resident device 340 is typically kept within the home environment, resident device 340 can stay connected to accessories within the home environment when other user devices (e.g., user device 302) cannot. For example, user device 302 may enter and exit the home environment and, accordingly, connect to and disconnect from accessories and other user devices (e.g., resident device 340) within the home environment. Since resident device 340 is consistently (if not constantly) connected to the accessories and/or user devices within the home environment, resident device 340 may have a more complete set of historical accessory state data, context data, and/or user device state data than a user device (e.g., user device 302) that may enter and exit the home environment more frequently. Thus, because resident device 340 can consistently collect state data from various accessories and/or user devices, resident device 340 may be better suited to analyzing historical accessory state data and generating scene suggestions, scene trigger suggestions, and detecting anomalous accessory states than user device 302. After generating suggestions or detecting anomalous accessory state, resident device 340 can send the suggested scene information, suggested trigger information, and/or anomalous accessory state information to home application 304 on user device 302 for presentation to the user, as described below.

Monitoring Accessory States

Figure 4:
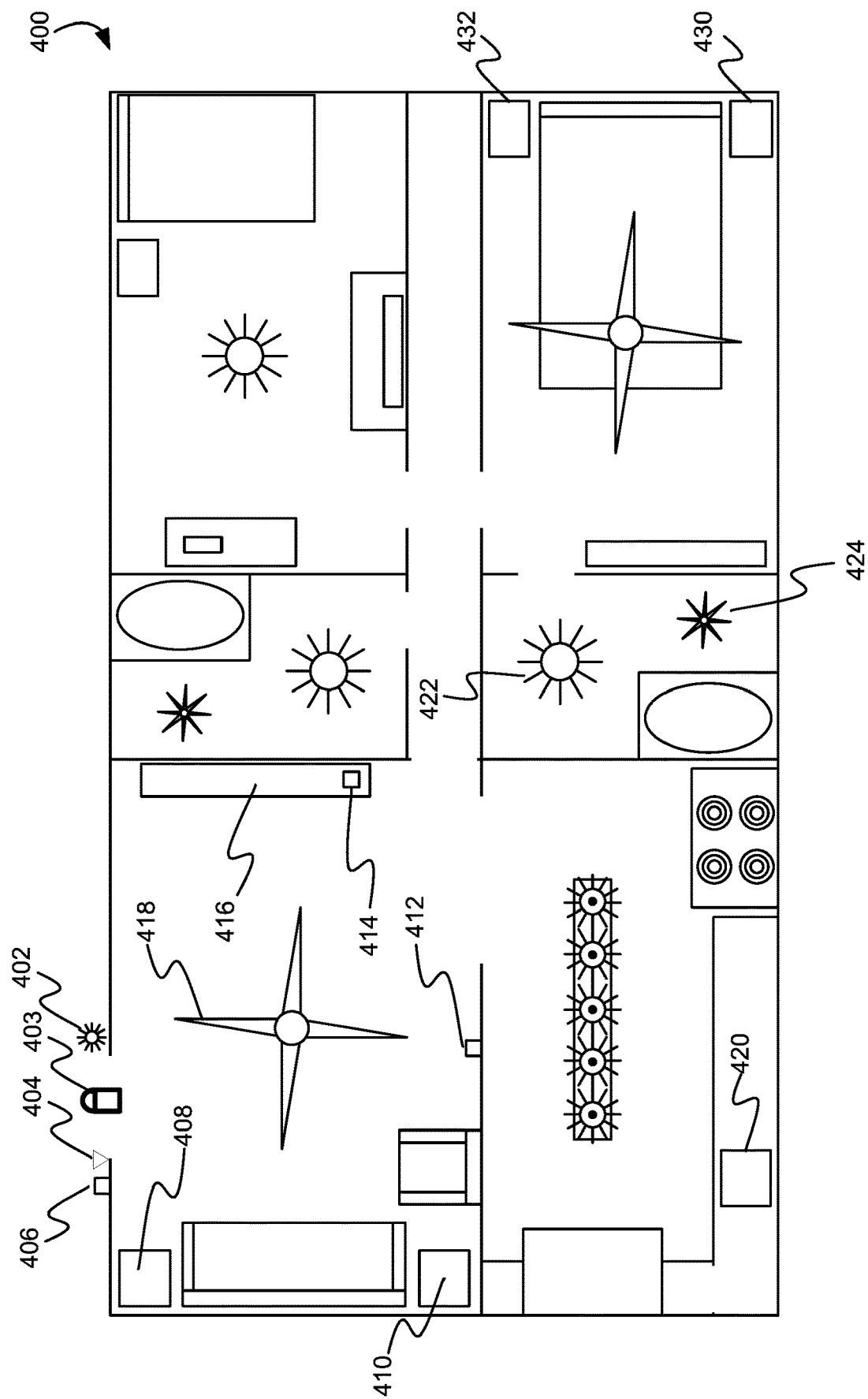
FIG. 4 is an illustration of an example home environment having various smart accessories.

FIG. 4 is an illustration of an example home environment 400 having various smart accessories 402-432. While the description of the technologies described herein are described with reference to a home or residence, a person of ordinary skill in the art will understand that the features, processes, algorithms, and mechanisms implemented by these technologies can be easily applied to other contexts such as an office, a warehouse, a garage, or other environment.

In some implementations, home environment 400 can be configured with smart accessories 402-432. For example, smart accessories 402-432 can correspond to accessories 310 and/or 320 of FIG. 3. Smart accessories 402-432 can be managed and/or controlled by home application 304 and/or home daemon 305 on user device 302, as described herein. Similarly, smart accessories 402-432 can be managed and/or controlled by home daemon 345 on resident device 340, as described herein. For simplicity, the descriptions that follow may describe embodiments, implementations, and/or features with reference to user device 302 and/or home application 304. However, resident device 340 (e.g., home daemon 345) may perform the same or similar embodiments, implementations, and/or features as described herein with reference to home application 304 and/or home daemon 305 on user device 302.

In an example scenario (e.g., scenario 'A'), at the front entrance (e.g. front door) of home environment 400, the owner (i.e., the user of user device 302) of home environment 400 has installed an external light 402, an external camera 404, and an external doorbell 406. When a visitor rings doorbell 406, doorbell 406 can send a status message to home application 304 on user device 302 indicating that someone manipulated (e.g., pressed a button) doorbell 406 to cause doorbell 406 to ring. In response to receiving the message, home application 304 can present a notification on the display of user device 302 notifying the user that doorbell 406 has been rung. The user can then provide input to home application 304 to turn on external light 402 and camera 404 so that the user can view the person at the door using a video feed from camera 404 presented on the display of user device 302. The user may provide input to home application 304 to cause home application 304 to unlock the door using door lock 403 when the user knows the visitor and wants the visitor to enter home environment 400.

In another example scenario (e.g., scenario 'B'), the living room of home environment 400 can include lamp 408 and lamp 410. For example, lamp 408 (e.g., a light bulb, light fixture, lamp, etc.) can be an accessory (e.g. accessory 310) that has various features. Lamp 408 may, for example, simply turn on and off like a normal light. Lamp 408 may be able to illuminate different colors. Lamp 408 may be dimmable such that lamp 408 can illuminate at different brightness levels. Lamp 410, for example, can have similar or different features than lamp 408. For example, lamp 408 may only be able to turn on and off, while lamp 410 might have a dimmer and color selection features. When the user enters the living room to watch television (e.g., smart television 416 and/or streaming media device 414), read a book, or play a game, the user can turn on (e.g., when watching television) or off (e.g., when reading or playing a game) lamps 408 and 410. The user can turn on and off lamps 408 and lamp 410 remotely using home application 304 or manually by interacting with each lamp individually.

As another example scenario (e.g., scenario 'C'), the living room of home environment 400 can include air conditioner controller 412 (e.g., a smart thermostat), streaming media device 414, smart television 416, and/or smart fan 418. When the user watches television in the living room, the user may turn on smart television 416, streaming media device 414, fan 418, and turn on the home air conditioner using controller 412 to make the room nice and cool for watching television. The user can turn on these accessories manually using switches on the accessories and/or typical remote controls. The user can turn on these accessories using home application 304 on user device 302. When the user is finished watching television, the user can turn off these accessories manually using switches on the accessories and/or typical remote controls. The user can turn off these accessories using home application 304 on user device 302.

As another example scenario (e.g., scenario 'D'), in a bedroom of home environment 400 the user may have installed smart lamps 432 and 434 next to the user's bed. The user's morning routine might be that the user turns on lamp 432 and/or lamp 434 and goes to the kitchen and turns on smart coffee maker 420 before going to the bathroom and turning on smart light 422 and smart fan 424 before taking a shower. The user can turn on each of these accessories manually and individually by interacting physically with each device. The user can turn on each of these accessories using home application 304 on user device 302.

When the user interacts, manipulates, or changes the state of the accessories (e.g., as described in the scenarios above), each accessory can report a state change event that identifies its new state (e.g., now current state) to home application 304 and/or home daemon 305 on user device 302. Home application 304 and/or home daemon 305 can store the state change event information (e.g., accessory state information) received from the accessories in accessory state database 308. For example, accessory state database 308 can store for each state change event an accessory identifier, a timestamp indicating when the event occurred, and/or the new state for the accessory. Thus, accessory state database 308 can store a history of accessory state changes over time.

In some implementations, accessories (e.g., accessory 310) can report other state information to home application 304 and/or home daemon 305. For example, accessory 310 can send error state information to home application 304 and/or home daemon 305. For example, accessory 310 can determine a problem with the power supply (e.g., battery level is low, external power disconnected, etc.) for accessory 310 and report the power supply problem to home application 304 and/or home daemon 305. Accessory 310 can determine a problem with the configuration of accessory 310 (e.g., the firmware or software is out of date) and report the configuration problem to home application 304 and/or home daemon 305. Accessory 310 can determine a security problem (e.g., an unauthorized user attempted to access the accessory) and report the security problem to home application 304 and/or home daemon 305. As described above, when home application 304 and/or home daemon 305 receives information describing a state change event, home application 304 can store the state change event data in accessory state database 308.

In some implementations, home application 304 and/or home daemon 305 can collect context information associated with accessory state changes. For example, the context information can include a timestamp indicating when the accessory state changes occur. The context information can include information describing a duration (e.g., start time, end time, duration, etc.) of a corresponding accessory state. The context information can include information describing which user devices are in home environment 400 when the accessory state changes occur. The context information can include detected events that occur within home environment 400. For example, an event can be an accessory state change event, as described above. An event can be a user device entering or exiting home environment 400. Each event can include a timestamp indicating when the event occurred, for example. Home application 304 and/or home daemon 305 can store the collected context information in accessory state database 308.

Automatically Determining Related Accessories

In some implementations, home application 304 can use the historical accessory state information to determine patterns of use and determine relationships between accessories based on the historical patterns of use. For example, home application 304 and/or home daemon 345 may periodically analyze the data in accessory state database 308/348 to determine related accessories and make suggestions for new accessory groups, scenes, and/or scene triggers, as described further below. For example, in scenario 'A' described above, the user uses doorbell 406, external light 402, camera 404, and/or lock 403 within a short period of time of each other to determine who rang the doorbell and/or to let the visitor in home environment 400. Because these accessories are reporting their states and/or state changes to home application 304 and/or home daemon 305, accessory state database 308 can include state change entries for light 402, lock 403, camera 404, and/or doorbell 406 indicating that all of these accessories change state within a short period of time. For example, the accessory state change entries can include an identifier for the accessory, a timestamp for when the state change occurred, a description of or value corresponding to the state change (e.g., on, off, locked, unlocked, etc.) and/or the context of the state change. For example, state change context can include context information such as the time when the state change occurred, a device identifier for the device that caused the state change, device identifiers for devices that were in the home environment (e.g. the same environment as the accessory that changed state), timestamps indicating when devices entered and/or exited the home environment, and/or any other context information that can be obtained from the devices (e.g., user device 302, resident device 340, etc.) within the home environment, as may be described herein.

In some implementations, home application 304 (and/or home daemon 305) can determine related accessories based on historical patterns of use. For example, home application 304 can compare the timestamps for entries in database 308 to determine that the each of these accessories change state at about the same time (e.g., within a threshold period of time). Based on the timing of the accessory state change entries in database 308, home application 308 can determine a historical pattern of use that indicates that light 402, lock 403, camera 404, and/or doorbell 406 are typically used together and are, therefore, related.

In some implementations, home application 304 can implement a relatedness algorithm to determine associations between accessories based on recorded (e.g., historical) accessory state changes. For example, home application 304 can implement an a priori algorithm (or other shopping cart algorithm) to determine associations between accessories based on accessory state changes over time. For example, accessory state changes that occur within a window of time (e.g., 1 minute, 2 minutes, 3 minutes, or other short period of time, etc.) can be grouped together and considered a single state change transaction.

Home application 304 (or home daemon 305) can analyze the state change transactions using the relatedness algorithm to determine associations between accessories over time. For example, to determine relatedness, home application 304 can determine two scores: a support score and a confidence score. The support score can, for example, be used to filter out infrequent transactions and/or patterns that are not significant. The events can be accessory state change events. The events can be trigger events, as described further below. The confidence score can indicate a level of confidence that events are actually related.

To generate the support score, home application 304 can determine the total number of events (T) in accessory state database 308 during a period of time (e.g., one week, two weeks, one month, etc.). Example events are turning on a light, turning on a coffee maker, etc. Home application 304 can then determine the number of times (N) a group of events (e.g., two or more) occur within a small window of time. For example, home application 304 can determine the number of times the coffee maker is turned on within one minute of the light being turned on based on the accessory state change event data in database 308. Home application 304 can then calculate the ratio N/T to generate the support score. For example, if there are 100 total events within database 308 during a one week time period and the light and coffee maker are turned on within one minute of each other 30 times for 60 events total (e.g., 2 accessories×30 events each), then the support score is 60/100 (e.g., 0.60 or 60%). If the support score for a group of events is below a support threshold value (e.g., 0.01, 0.05, etc.), then home application 304 can eliminate the group of events from further analysis when determining accessory groups, scene suggestions, and/or trigger suggestions. The support score can be used by home application 304 to eliminate infrequent transactions and/or patterns that are not significant.

To generate the confidence score, home application 304 can determine the number of times (M) a particular accessory event (e.g., light turns on) occurs within database 308 within the period of time described above. For example, home application 304 can determine that the light is turned on 70 times. Home application 304 can then determine the number of times (N) two events occur within a small window of time. For example, home application 304 can determine the number of times the coffee maker is turned on within one minute of the light being turned on based on the accessory state change event data in database 308. Home application 304 can then calculate the ratio N/M to generate the confidence score. For example, if there are 70 events within database 308 during a one week time period where the light is turned on and 60 events where the light and coffee maker are turned on within one minute of each, then the confidence score is 60/70 (0.86 or 86%). If the confidence score is above a confidence threshold value, then home application can determine a high confidence that the events are related. For example, if home application 304 determines that there is a high confidence that two or more accessory state change events are related, then the accessories may be grouped into a service group, into a scene, or one accessory state change can be determined to trigger another state change event, as described herein.

Similarly, in scenario 'B' described above, the user uses lamp 408 and lamp 410 within a short period of time of each other to set up the living room to watch television or read a book. Because these accessories are reporting their states and/or state changes to home application 304 and/or home daemon 305, accessory state database 308 can include state change entries for lamp 408 and lamp 410 indicating that these accessories change state within a short period of time of each other. For example, the accessory state change entries can include an identifier for the accessory, a timestamp for when the state change occurred, and a description of the state change (e.g., on, off, dimmer level, light color, etc.). Home application 304 can compare the timestamps for entries in database 308 to determine that each of these accessories changes states at about the same time (e.g., within a threshold period of time). Based on the timing of the accessory state change entries in database 308, home application 304 can determine a historical pattern of use that indicates that lamp 408 and lamp 410 are typically used together and are, therefore, related.

In scenario 'C' described above, the user uses air conditioner controller 412, streaming media device 414, smart television 416, and/or smart fan 418 within a short period of time of each other to set up the living room to watch television. Because these accessories are reporting their states and/or state changes to home application 304 and/or home daemon 305, accessory state database 308 can include state change entries for air conditioner controller 412, streaming media device 414, smart television 416, and smart fan 418 indicating that these accessories change state within a short period of time of each other. For example, the accessory state change entries for each accessory can include an identifier for the accessory, a timestamp for when the state change occurred, and a description of the state change (e.g., on, off, television channel, fan speed, streaming media source, etc.). Home application 304 can compare the timestamps for entries in database 308 to determine that each of these accessories changes states at about the same time (e.g., within a threshold period of time). Based on the timing of the accessory state change entries in database 308, home application 308 can determine a historical pattern of use that indicates that air conditioner controller 412, streaming media device 414, smart television 416, and smart fan 418 are typically used together and are, therefore, related.

In scenario 'D described above, the user uses smart lamp 432, smart lamp 434, coffee maker 420, smart light 422 and smart fan 424 within a short period of time of each other as part of the user's morning routine. Because these accessories are reporting their states and/or state changes to home application 304 and/or home daemon 305, accessory state database 308 can include state change entries for smart lamp 432, smart lamp 434, coffee maker 420, smart light 422 and smart fan 424 indicating that these accessories change state within a short period of time of each other. For example, the accessory state change entries for each accessory can include an identifier for the accessory, a timestamp for when the state change occurred, and a description of the state change (e.g., on, off, coffee maker setting, etc.). Home application 304 can compare the timestamps for entries in database 308 to determine that each of these accessories changes states at about the same time (e.g., within a threshold period of time). Based on the timing of the accessory state change entries in database 308, home application 308 can determine a historical pattern of use that indicates that smart lamp 432, smart lamp 434, coffee maker 420, smart light 422 and smart fan 424 are typically used together and are, therefore, related.

Generating Service Groups Suggestions

In some implementations, home application 304 and/or home daemon 345 can automatically generate service group suggestions based on related accessories. For example, when home application 304 determines that accessories are related, as described above, home application 304 can automatically create a service group that includes the related accessories. For example, home application 304 can create a service group (e.g., "Front Door Security") that includes light 402, lock 403, camera 404, and/or doorbell 406, as described in scenario 'A' above. Home application 304 can automatically create a service group (e.g., "Living Room Lights") that includes lamp 408 and lamp 410, as described in scenario 'B' above. Home application 304 can automatically create a service group (e.g., "Living Room Entertainment") that includes air conditioner controller 412, streaming media device 414, smart television 416, and smart fan 418, as described in scenario 'C' above. Home application 304 can automatically create a service group (e.g., "Wake Up") that includes smart lamp 432, smart lamp 434, coffee maker 420, smart light 422 and smart fan 424, as described in scenario 'D' above. After generating the service group, home application 304 can present a service group suggestion on a graphical user interface of home application 304. For example, the user can select the service group suggestion to approve the service group suggestion and have the service group presented on GUI 500 of FIG. 5.

In some implementations, home application 304 can manage accessories in a service group as a collective (e.g., as a single entity). For example, even though a service group may include multiple accessories, home application can provide a group control that allows the user to adjust the settings of multiple accessories in a service group with a single input. Similarly, notifications generated by an accessory in a service group can be treated and/or presented as a service group notification rather than an individual accessory notification. By combining accessories into a service group, the user can more easily find, control, and interact with accessories to adjust or control the user's environment.

Generating Scenes Suggestions

In some implementations, home application 304 and/or home daemon 345 can automatically generate scenes suggestions based on related accessories. For example, while a service group provides group controls for the user to specify settings for the service group, a scene is configured with settings so that when a user invokes or selects a scene home application 304 automatically adjusts the state of the accessories in the scene to match the configured settings for the scene. For example, when creating a scene, home application 304 can determine that accessories are related based not only on timing, as described above, but also based on the states of the related accessories. For example, home application 304 can determine a pattern of use where accessories are used at about the same time and the settings are the same in each instance of the pattern of use over time.

In some implementations, the relatedness algorithm described above can be used to determine relatedness of accessory states when making scene suggestions. For example, instead of just analyzing transactions for accessory identifiers, home application 304 can use the a priori algorithm to determine the relatedness of accessory states or accessory state change events by analyzing accessory identifier-state pairs. An accessory identifier-state pair can, for example, be a pairing of an identifier for an accessory and the state of the accessory recorded at a particular time. For example, home application 304 can determine that several accessory identifier-state pairs are related when the accessory identifier-state pairs frequently appear in transactions together. The accessory identifier-state pairs for scenario 'A' described above can be, for example, '402:on' (e.g., light 402 is in the 'on' state), '403:unlocked' (e.g., lock 403 is in the 'unlocked' state), '404:on' (e.g., camera 404 is in the 'on' state), and '406:on' (e.g., doorbell 406 is in the 'on' state—the doorbell has been rung).

Similarly to the relatedness algorithm described above, home application 304 can determine that several accessory identifier-state pairs are related when the accessory identifier-state pairs appear together more than the threshold percentage of time. For example, if the analysis of the accessory identifier-state pairs for light 402, lock 403, camera 404 and doorbell 406 results in a confidence score that is greater than a scene confidence threshold value (e.g., 90%, 80%, etc.), then home application 304 can determine that the respective states of light 402, lock 403, camera 404 and doorbell 406 are related enough to be included in a scene suggestion.

However, in addition to the confidence score, home application 304 can analyze accessory state change data to determine temporal or contextual consistency between related accessory state changes when generating a scene suggestion. For example, home application 304 can determine whether accessory state change data in database 308 has a pattern of accessory state changes that indicates that a group of accessories consistently changes state at a particular time of day, particular day of the week, etc. Home application 304 can determine whether accessory state change data in database 308 has a pattern of accessory state changes that indicates that a group of accessories consistently changes state when a particular context occurs (e.g., the user arrives in the home environment). Thus, if an accessory or group of accessories usually change to a particular state at a particular time of day or in response to a particular context, home application 304 can generate a scene suggestion for the group of accessories.

For example, in scenario 'A' above, when doorbell 406 rings (state=on), the user turns on both light 402 (state=on) and camera 404 (state=on). Home application 304 can create scene (e.g., scene 'A') that includes light 402 and camera 404 because database 308 will have historical state data that indicates a historical pattern of use that includes turning on light 402 and camera 404 at about the same time. A short time later, the user may unlock lock 403 to let a visitor in the user's home. Thus, the state of lock 403 can be 'unlocked'. Home application 304 can configure scene 'A' so that when the user invokes or selects scene 'A', home application 304 will cause light 402 and camera 404 to turn on. Home application 304 may exclude lock 403 from scene 'A' because lock 403 is a security-related accessory that might require further user input in order to change state. After generating and configuring a scene, home application 304 can present a scene suggestion on a graphical user interface of home application 304. For example, the user can select the scene suggestion to approve the scene suggestion and have the scene presented on GUI 500 of FIG. 5, as described further below.

As another example, in scenario 'C' above, the user may set air conditioner controller 412 to 60 degrees, set smart fan 418 to medium speed, turn on streaming media device 414, and turn on smart television 416 and set the television to the input for streaming media device 414. Home application 304 can create scene (e.g., scene 'C') that includes air conditioner controller 412, smart fan 418, streaming media device 414, and smart television 416 because database 308 will have historical state data that indicates a historical pattern of use that includes changing the setting of air conditioner controller 412 to 60 degrees, changing the setting of smart fan 418 to medium speed, turning on streaming media device 414, and turning on smart television 416 and setting the input to the input corresponding to streaming media device 414 at about the same time. Home application 304 can configure scene 'C' so that when the user invokes or selects scene 'C', home application 304 will set air conditioner controller 412 to 60 degrees, set smart fan 418 to medium speed, turn on streaming media device 414, and turn on smart television 416 and set the television to the input for streaming media device 414.

Thus, home application 304 can automatically generate scenes (and scene suggestions) that recreate a previous state of related accessories that are typically used or adjusted at about the same time. Stated differently, home application 304 can automatically generate a scene based on a historical pattern of use that is based not only on which accessories are used within a short period of time (e.g., 1 minute, 3 minutes, 7 minutes, etc.) of each other but also based on the settings of each accessory when the accessories are used together.

Generating Trigger Suggestions

In some implementations, home application 304 can automatically generate suggestions for triggers. For example, a trigger can be an event that when detected by home application 304 causes home application 304 to automatically invoke a corresponding scene. A trigger can be an event that when detected by home application 304 causes home application 304 to automatically change the state of an accessory. A trigger can be determine based on historical accessory state change data and/or context data that indicates an event that usually precedes or follows a scene invocation, state changes related to an accessory group, or a state change related to an individual accessory. For example, the historical data may indicate that a particular accessory state change always or mostly follows a particular event such that the event is a reliable predictor of the particular accessory state change. For example, the user (or user device) entering the home environment can be a good predictor that the air conditioner will soon be turned on. The historical data may indicate that a particular accessory state change always or mostly precedes a particular event. For example, the user may typically lock the front door before going to sleep. User device 302 can predict when the user will go to sleep and automatically lock the front door in anticipation of the user sleeping.

In some implementations, the trigger event can be an accessory state change event. For example, the accessory state change event can be that the garage door opens, the front doorbell is rung, the thermostat detects a specified temperature, or any other accessory state change. The trigger event can correspond to a change in location of a user device. For example, user device 302 can report device state information, including the device's current location, to home application 304 and/or home daemon 305. Home application 304 can determine a trigger for a scene, accessory group, or individual accessory based on the location of user device 302. For example, user device 302 can send location information indicating that user device 302 has left the user's work location. In response to detecting that user device 302 has left the user's work location, home application 304 can trigger a 'welcome home' scene that turns on the air conditioner at the user's home and turns on the radio to the user's favorite program or station. The trigger event can be a time-based event. For example, the event can be that the current time is 6 pm. When home application 304 detects that the current time is 6 pm (or other time), home application 304 can invoke the corresponding scene, or change the state of an accessory group or individual accessory.

In some implementations, the trigger event can correspond to a change in the home environment. For example, home daemon 345 on resident device 340 can detect when different user devices (e.g., user device 302) connect to and/or disconnect from the home environment and/or resident device 340. For example, a family of three may live within a home managed by home application 304 and/or home daemon 345. As each member of the family enters and leaves the home environment with their respective devices, the devices can connect and disconnect with the accessories and other user devices (e.g., resident device 340) within the home environment. Thus, resident device 340 can detect when devices enter and leave the home environment and/or determine which user devices are within the home environment at any time. This context information (e.g., which devices are within the home environment) and/or device connecting and disconnecting events can be used as triggers for scenes. For example, when home daemon 345 detects that someone (e.g., some user device) has left the home environment and nobody else (e.g., no other user-specific device) is left within the home environment, then home daemon 345 can use the leaving home event as a trigger for a scene that turns off lights, air conditioner, coffee maker, and locks all doors and windows. The context information can be used to trigger state changes in accessories associated with accessory groups (e.g., service groups) and/or individual accessories.

In some implementations, home application 304 can use context information to generate conditional triggers. For example, home application 304 can determine that unlocking the front door lock is a trigger for turning on an entrance light and adjusting the thermostat. However, turning on the entrance light can be conditioned on context information that indicates the door lock was unlocked after sunset. For example, home application 304 can determine that the light is typically only turned on when it is dark outside and/or inside the house (e.g., as indicated by light sensor data or sunset/sunrise times). Further, home application 304 can determine based on context information (e.g., temperature sensor data reported by a thermostat) that the thermostat is typically only adjusted when the temperature inside the house is above 76 degrees or below 66 degrees Fahrenheit. Thus, the context data collected by home application 304 can be used to generate triggers that are conditioned upon specific context, as determined based on historical context data and/or historical accessory state change event data.

In some implementations, the trigger event can correspond to other context information reported by user device 302. For example, user device 302 may be configured to determine a current user activity based on sensor data generated by user device 302. For example, user device 302 may be configured to determine when the user is sleeping, awake, running, walking, sitting, driving, etc., based on motion sensor data, sound sensor data, light sensor data, and/or other sensor data collected by user device 302. User device 302 can send this user activity data to home application 304 and/or home daemon 305. User device 302 can send this user activity data to home daemon 345 on resident device 340. Thus, home application 304 and/or home daemon 305/345 can determine triggers for scenes, accessory groups, and/or individual accessories based on the reported user activity data. While triggers are described herein with reference to scene triggers, triggers for service groups and individual accessories can be generated similarly to scene triggers.

In some implementations, the relatedness algorithm described above can be used to determine relatedness of trigger events to scenes, service groups, and/or individual accessories when making trigger suggestions. For example, instead of just analyzing transactions for accessory identifiers and/or accessory states to determine scene suggestions, as described above, home application 304 can use the relatedness algorithm to determine the relatedness of detected events (e.g., detected contexts) to scenes (e.g., accessories and/or accessory states). For example, accessory state database 308 can include context data and/or event data that is timestamped to indicate a time at which the context was reported and/or when the reported event occurred. These contexts and/or events can be included with the accessory state change events when grouping the accessory state change events into transactions.

Home application 304 can determine that detected events and/or contexts are related to a scene when the detected events frequently appear in transactions with a suggested or determined scene, as described above. For example, home application 304 and/or home daemon 345 can determine a time based trigger when the user typically (e.g., above a threshold percentage of the time) invokes a particular scene around 7 pm. Home application 304 and/or home daemon 345 can determine a time based trigger relative to some event. For example, home application 304 can determine that the user invokes a particular scene or adjusts a particular accessory (e.g., a light on the front porch) 30 minutes after sunset. Home application 304 and/or home daemon 345 can determine a location based trigger when the user typically (e.g., above a threshold percentage of the time) invokes a particular scene when the user arrives at the user's home (e.g., home environment). Home application 304 and/or home daemon 345 can determine a user activity based trigger when the user typically (e.g., above a threshold percentage of the time) invokes a particular scene after the user wakes, one hour before the user sleeps, 30 minutes after the user exercises, or after the user performs some other detectable activity. For example, home application 304 can determine that a detected event or context is a trigger for a scene when the confidence score for the candidate trigger event and scene is above a trigger confidence threshold value (e.g., 80%, 95%, etc.), as described above.

After home application 304 and/or home daemon 345 determines a suggested trigger, home application 304 can present the suggested scene trigger on a graphical user interface of home application 304, as described below. For example, if home daemon 345 on resident device 340 generates the suggested scene trigger (or suggested scene, or suggested service group, as described above), home daemon 345 can send the suggested scene trigger to home application 304 on user device 302 for presentation to the user.

Figure 5:
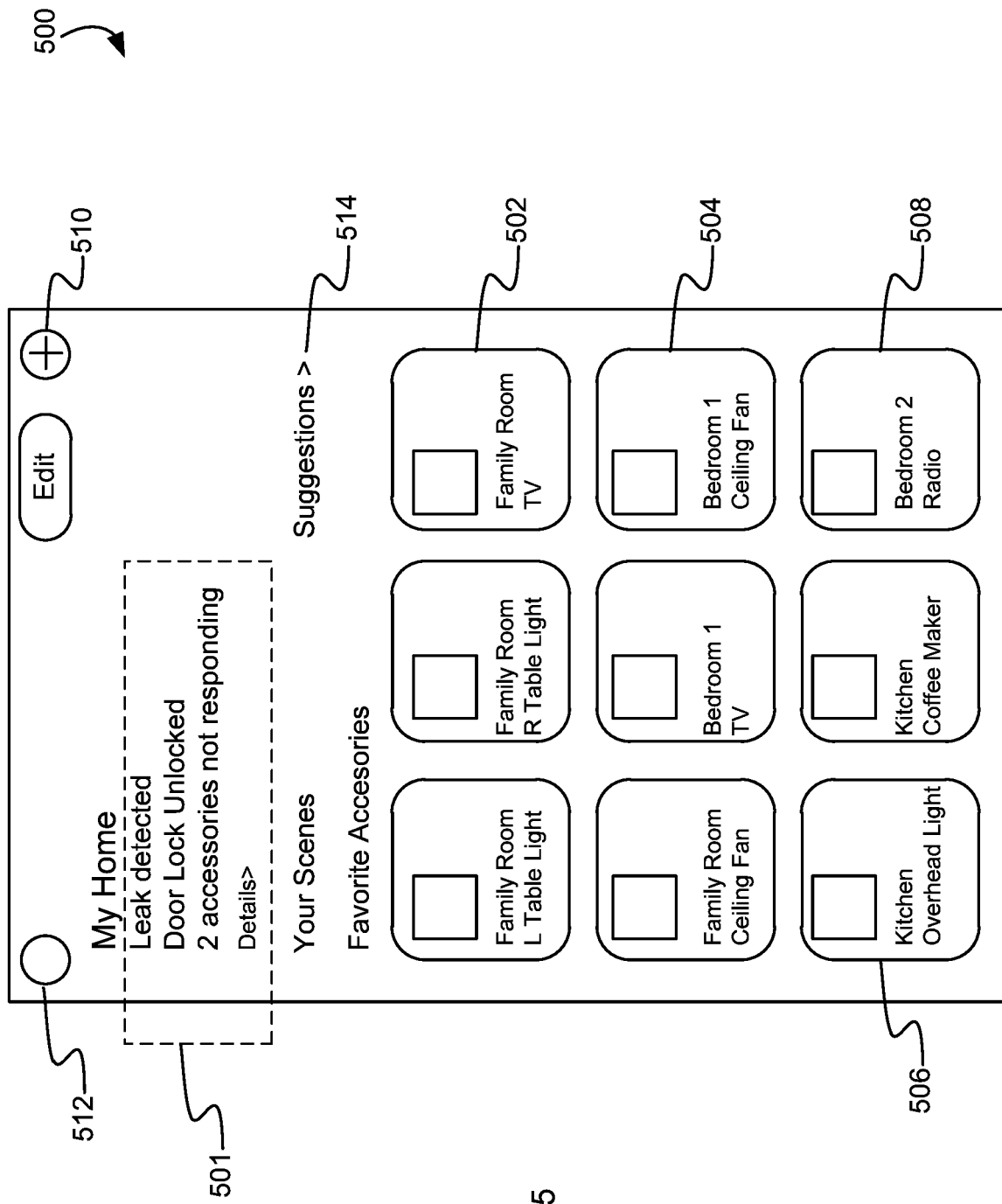
FIG. 5 is an example graphical user interface presented by a home application.

FIG. 5 is an example graphical user interface 500 presented by home application 304. For example, graphical user interface (GUI) 500 can be the initial graphical interface (e.g., home screen, default GUI, etc.) presented when home application 304 is invoked on user device 302. GUI 500 can be presented on a display of user device 302, for example. GUI 500 can be an interface for managing accessories within a home, office, or other building. Home application 304 can be configured to manage accessories within different homes, offices, buildings, environments, etc., and the user can provide input to home application 304 to switch between environments to view the accessories, service groups, scenes, etc., configured for each environment. The descriptions that follow will describe various implementations, features, processes, and graphical user interfaces of home application 304 with respect to the user's home (e.g., labeled "My Home"), however the implementations described herein can be applied to any environment, not just the user's home.

In some implementations, GUI 500 can include status element 501. For example, status element 501 can present accessory status data reported by the various accessories (e.g., accessory 310, accessory 320) connected to (e.g., registered with, paired with, etc.) home application 304, as described above. Status element 501 can present accessory status data as determined by home application 304. For example, home application 304 may determine that accessory 320 is unreachable or unresponsive when the connection between home application 304 and accessory 320 is broken (e.g., the network is unavailable, the accessory has lost power, etc.). Status element 501 can provide the user a quick view of the current status of the user's home accessories. Status element 501 is described in further detail below in reference to FIG. 21A and FIG. 21B.

In some implementations, GUI 500 can include graphical elements 502-508 representing accessories that have been paired with home application 304. For example, if home application 304 has been configured to communicate with or has previously established a connection with an accessory, the accessory can be represented on GUI 500. However, because of the limited display space available on most mobile devices, GUI 500 may only display accessories that the user has designated as favorites. If an accessory is currently connected to home application 304, the corresponding graphical element (e.g., graphical element 502) can present a full, bright color representation of the accessory. If an accessory is not current connected to home application 304, the corresponding graphical element can present a subdued, greyed, or otherwise diminished representation of the accessory.

In some implementations, graphical elements 502-508 can appear as tiles that include information (e.g., accessory type, location, status, etc.) describing the corresponding accessory. For example, graphical element 502 can represent and describe a television (e.g., smart television 416) that is located in the user's family room. Graphical element 504 can represent and describe a ceiling fan that is located in the user's bedroom. Graphical element 506 can represent and describe an overhead light that is located in the user's kitchen. Graphical element 508 can represent and describe a radio that is located in the user's bedroom. The user can select (e.g., tap) any of the tiles to turn on and off (e.g., toggle back and forth) the corresponding accessory. The user can select (e.g., touch and hold, apply pressure, etc.) any of the tiles to cause home application 304 to present a detailed view (not shown) of the corresponding accessory, including presenting any additional controls the user can select to manipulate the settings of the corresponding accessory. In some implementations, GUI 500 can include graphical element 510 for adding an accessory, creating a new service group, and/or creating a new scene.

In some implementations, GUI 500 can include graphical element 512 for selecting a home environment to present on GUI 500. For example, a user may have different home environments configured in home application 304. The user may have a primary home environment, a vacation home environment, an office environment, etc. Each one of these home environments can be configured with smart accessories and managed by home application 304, as described herein. As depicted in FIG. 5, home application 304 is currently presenting accessories and status information for the user's primary home environment labeled "My Home." However, the user can select graphical element 512 to cause home application 304 to present or represent a different home environment on GUI 500.

In some implementations, GUI 500 can include graphical element 514 for presenting scene suggestions. For example, home application 304 and/or home daemon 305 on user device 302 can be configured to generate scene suggestions and/or scene trigger suggestions, as described above. Home daemon 345 on resident device 340 can be configured to generate scene suggestions and/or scene trigger suggestions. When home daemon 305 on user device 302 and/or home daemon 345 on resident device 340 generate scene suggestions and/or scene trigger suggestions, home daemon 305 and/or home daemon 345 can send the suggestions to home application 304 on user device 302. Home application 304 can present the scene suggestions and/or scene trigger suggestions on a graphical user interface of home application 304, as described further below.

Figure 6:
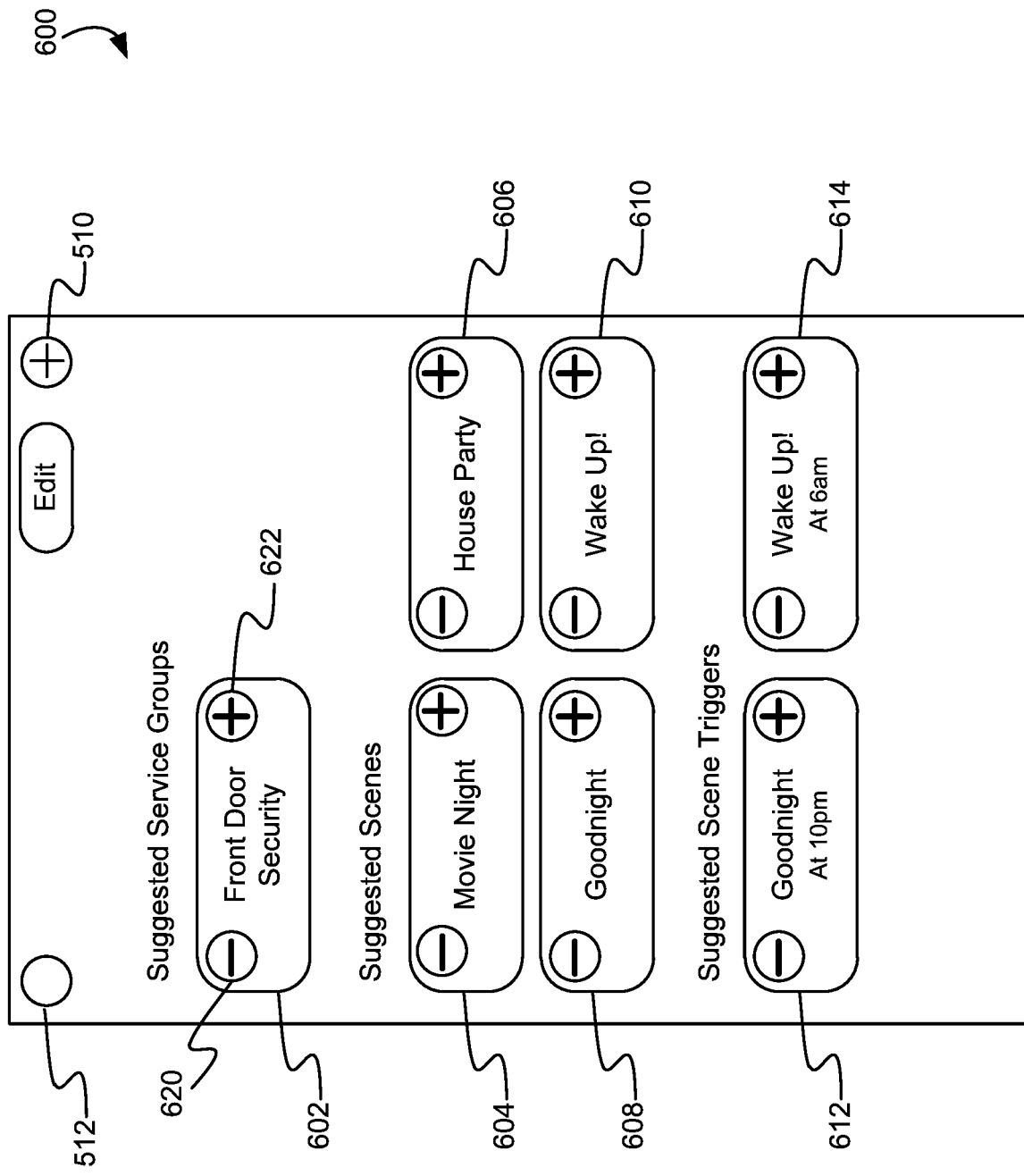
FIG. 6 illustrates an example graphical user interface for presenting suggested service groups, scenes, and/or scene triggers.

FIG. 6 illustrates an example graphical user interface 600 for presenting suggested service groups, scenes, and/or scene triggers. For example, GUI 600 can be presented by home application 304 on a display of user device 302 in response to receiving a user selection of graphical element 514 of FIG. 5.

In some implementations, GUI 600 can include service group suggestions. For example, GUI 600 can include graphical element 602 representing a suggested service group. As described above, home application 304 and/or home daemon 305/345 can generate a service group suggestions by determining which accessories are related based on timing of accessory state changes. After home application 304 generates the service group suggestion or receives the service group suggestion from home daemon 305/345, home application 304 can present graphical element 602 representing the service group suggestion on GUI 600. For example, graphical element 602 can represent a front door security service group that includes light 402, lock 403, camera 404, and/or doorbell 406.

Similarly, GUI 600 can include scene suggestions. For example, GUI 600 can include graphical elements 604-610 representing suggested scenes. As described above, home application 304 and/or home daemon 305/345 can generate scene suggestions by determining which accessories are related based on timing of accessory state changes and/or the accessory state values. After home application 304 generates the scene suggestions or receives the scene suggestions from home daemon 305/345, home application 304 can present graphical elements 604-610 representing the respective scene suggestions on GUI 600. For example, GUI 600 can include a "movie night" scene suggestions that includes air conditioner controller 412 (e.g., a smart thermostat), streaming media device 414, smart television 416, and/or smart fan 418 and is configured to change the state of these accessories to set up the home environment to watch movies on television 416.

In some implementations, GUI 600 can include suggested triggers for scenes. As described above, home application 304 and/or home daemon 305/345 can generate scene trigger suggestions by determining which accessories are related based on timing of detected events (e.g. context changes), timing of accessory state changes and/or the accessory state values. After home application 304 generates the scene trigger suggestions or receives the scene trigger suggestions from home daemon 305/345, home application 304 can present graphical elements 612-614 representing the respective scene suggestions on GUI 600. For example, GUI 600 can include a "Goodnight" scene trigger suggestion that includes a "Goodnight" scene (e.g., specifying state values for light 402, lock 403, lamp 408, lamp 410, etc.) and a "Goodnight" scene trigger (e.g., a particular time, a particular event, etc.) that will cause home application 304 to automatically invoke the "Goodnight" scene. As illustrated by FIG. 6, GUI 600 can include both a scene suggestion 608 for the "Goodnight" scene and a scene trigger for the "Goodnight" scene. For example, the user may select to approve the "Goodnight" scene but the user may not wish to have the "Goodnight" scene automatically invoked by the scene trigger 612.

In some implementations, home application 304 can receive user input to accept or reject a suggested service group, scene, or scene trigger. For example, each graphical element 602-614 representing a suggested service group, scene, or scene trigger can include graphical elements (e.g., graphical elements 620, 622) that a user can select to accept or reject a suggested item. For example, the user can select graphical element 620 to reject the corresponding suggested service group. When home application 304 receives a selection of graphical element 620, home application 304 can delete (e.g., remove, hide, etc.) graphical element 602 from GUI 600 and store data that will prevent home application 304 from presenting the corresponding service group again in the future. In some implementations, the user can select graphical element 622 to accept the suggested service group. For example, when home application 304 receives user input accepting a suggested service group, scene, or scene trigger, the corresponding service group, scene, or scene trigger can be removed from GUI 600 and presented on GUI 500 of FIG. 5.

In some implementations, home application 304 and/or home daemon 345 can adjust the thresholds (e.g., service group confidence threshold, scene confidence threshold, trigger confidence threshold, etc.) for the relatedness algorithm based on whether a user accepts or rejects a suggested item. For example, each type of suggested item (e.g., service group, scene, scene trigger, etc.) can have a different relatedness threshold. For example, the service group confidence threshold (e.g., 60%) can be lower than the scene confidence threshold (e.g., 70%). The scene confidence threshold can be lower than the trigger confidence threshold (e.g., 80%). When a user accepts or rejects a suggested service group, scene, or scene trigger, home application 304 can adjust the confidence threshold value for the type of item rejected or accepted. For example, when home application 304 receives user input rejecting a suggested trigger, home application 304 can adjust the trigger confidence threshold upward from 80% to 81%. Thus, fewer scene triggers will be suggested in the future. When home application 304 receives user input accepting a scene, home application 304 can adjust the scene confidence threshold down from 70% to 69% so that home application 304 will suggest more scenes.

In some implementations, home application 304 can present details for a suggested scene or scene trigger. For example, a user can select one of graphical elements 604-610 to cause home application 304 to present a GUI (e.g., GUI 700) for viewing and editing details about the corresponding suggested scene. The user can select one of graphical elements 612-614 to cause home application 304 to present a GUI (e.g., GUI 800) for viewing and editing details about the corresponding scene suggestion.

Figure 7:
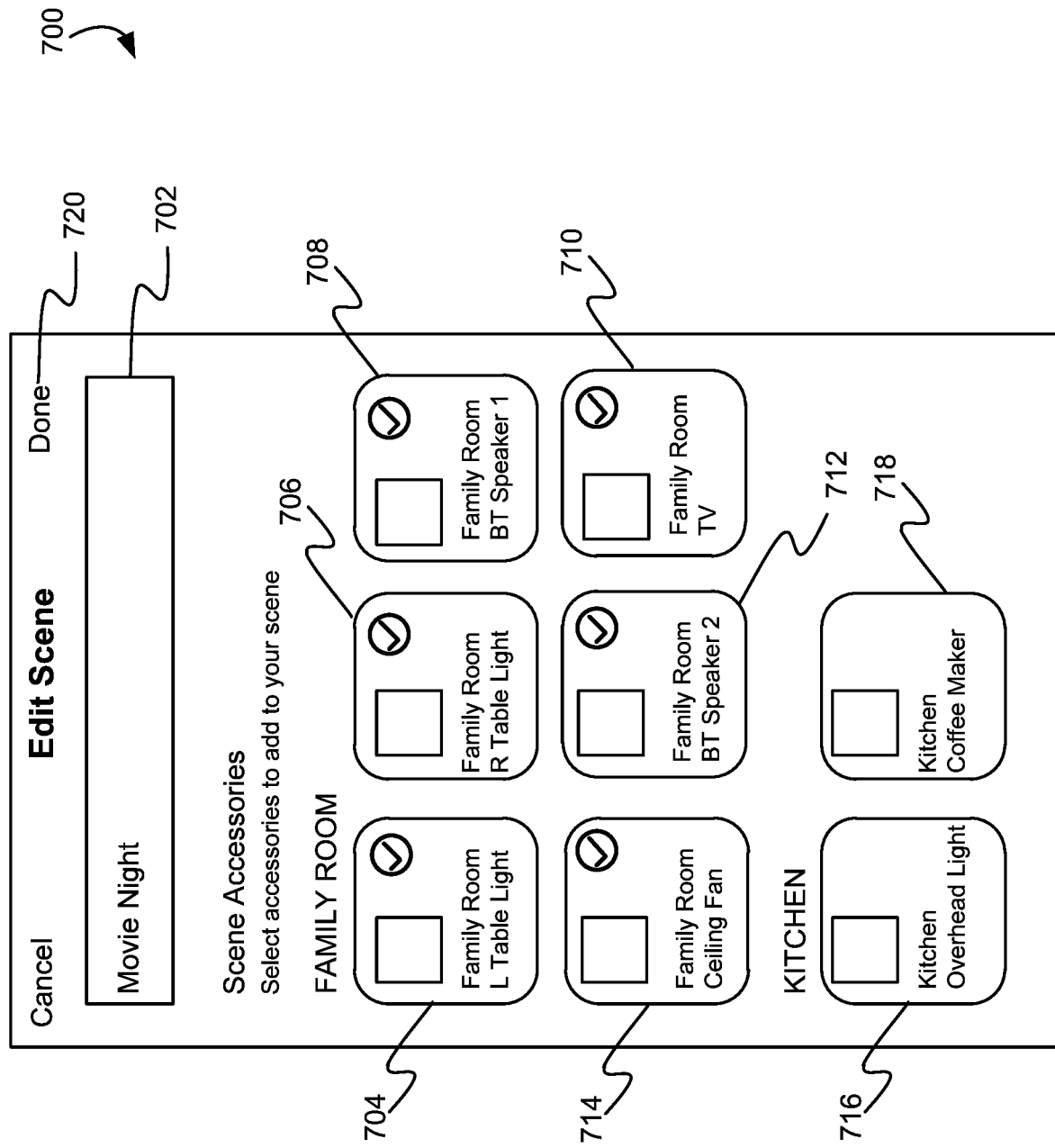
FIG. 7 illustrates an example graphical user interface for presenting details about a scene.

FIG. 7 illustrates an example graphical user interface 700 for presenting details about a scene. For example, GUI 700 can be presented by home application 304 on a display of user device 302 in response to the user selecting graphical element 604 of FIG. 6.

In some implementations, GUI 700 can include graphical element 702 (e.g., a text input box, a text control, etc.) for specifying a name for the selected scene. For example, the user can provide input to a virtual keyboard (not shown) to edit the name of the suggested scene. For example, the suggested scene may be automatically named by home application 304 and/or home daemon 345 initially. The user can provide input to graphical element 702 to rename the scene.

In some implementations, GUI 700 can present graphical elements (e.g., 704-714) representing accessories managed by home application 304. Accessories that are already part of the scene (e.g., accessories 704-710) can be marked with a graphical element (e.g., marked with the check mark) so that the user can easily see which accessories are already in the scene. The user can edit the suggested scene by selecting accessories managed by home application 304 and presented on GUI 700. For example, the user can select (e.g., tap) the accessories that the user wishes to add to the suggested scene or remove from the suggested scene. GUI 700 can receive the user input selecting graphical elements 704-714 and add or remove the corresponding accessories to the suggested scene. For example, when the user selects the suggested scene (e.g., element 604 on GUI 600), the suggested scene can include lamp 408, lamp 410, smart television 416, smart fan 418, and two Bluetooth speakers from the user's living room. The user can select graphical elements 704-714 to remove the corresponding accessories from the suggested scene. The user can select graphical elements 716 and/or 718 to add the corresponding accessories to the suggested scene.

In some implementations, home application 304 can automatically determine the initial settings for each accessory included in a scene. For example, accessories in the suggested scene can be configured with accessory states based on the accessory state history data, as described above. As accessories are added to a scene, home application 304 can determine the current state of the accessory. For example, if lamp 408 is added to the "Movie Night" scene in response to the user selecting graphical element 704, home application 304 can determine the current state (e.g., on or off, illumination level, illumination color, etc.) of lamp 408. Home application 304 can save the current state of lamp 408 as the scene setting (e.g., scene state) for lamp 408 in the "Movie Night" scene.

Similarly, when smart television 416 is added to the "Movie Night" scene in response to the user selecting graphical element 710, home application 304 can determine the current state (e.g., on or off, channel, input source, volume, etc.) of smart television 416. Home application 304 can save the current state of smart television 416 as the scene setting for smart television 416 in the "Movie Night" scene. If the user wishes to adjust the initial settings for a specific accessory, the user can select (e.g., long touch, pressure touch, etc.) the graphical element (e.g., graphical element 704) corresponding to the specific accessory to invoke a graphical user interface (not shown) for adjusting the settings of the specific accessory.

Later, when the "Movie Night" scene is invoked by the user, home application 304 can send messages to each accessory associated with the "Movie Night" scene specifying the scene setting saved for the accessory to cause each accessory to assume the saved scene setting. For example, if the "Movie Night" scene setting for lamp 408 is 50% illumination and blue color, home application 304 can send a message to lamp 408 indicating 50% illumination and blue color. In response to receiving the message from home application 304, lamp 408 can generate a blue light at 50% illumination. Similarly, if the "Movie Night" scene setting for smart television 416 is 70% volume and channel 4, home application 304 can send a message to smart television 416 indicating 70% volume and channel 4. In response to receiving the message from home application 304, smart television 416 can adjust its volume to 70% and change its channel to channel 4. When the user is done reviewing and/or editing the suggested scene, the user can select graphical element 720 to cause home application 304 to present GUI 600 of FIG. 6.

Figure 8:
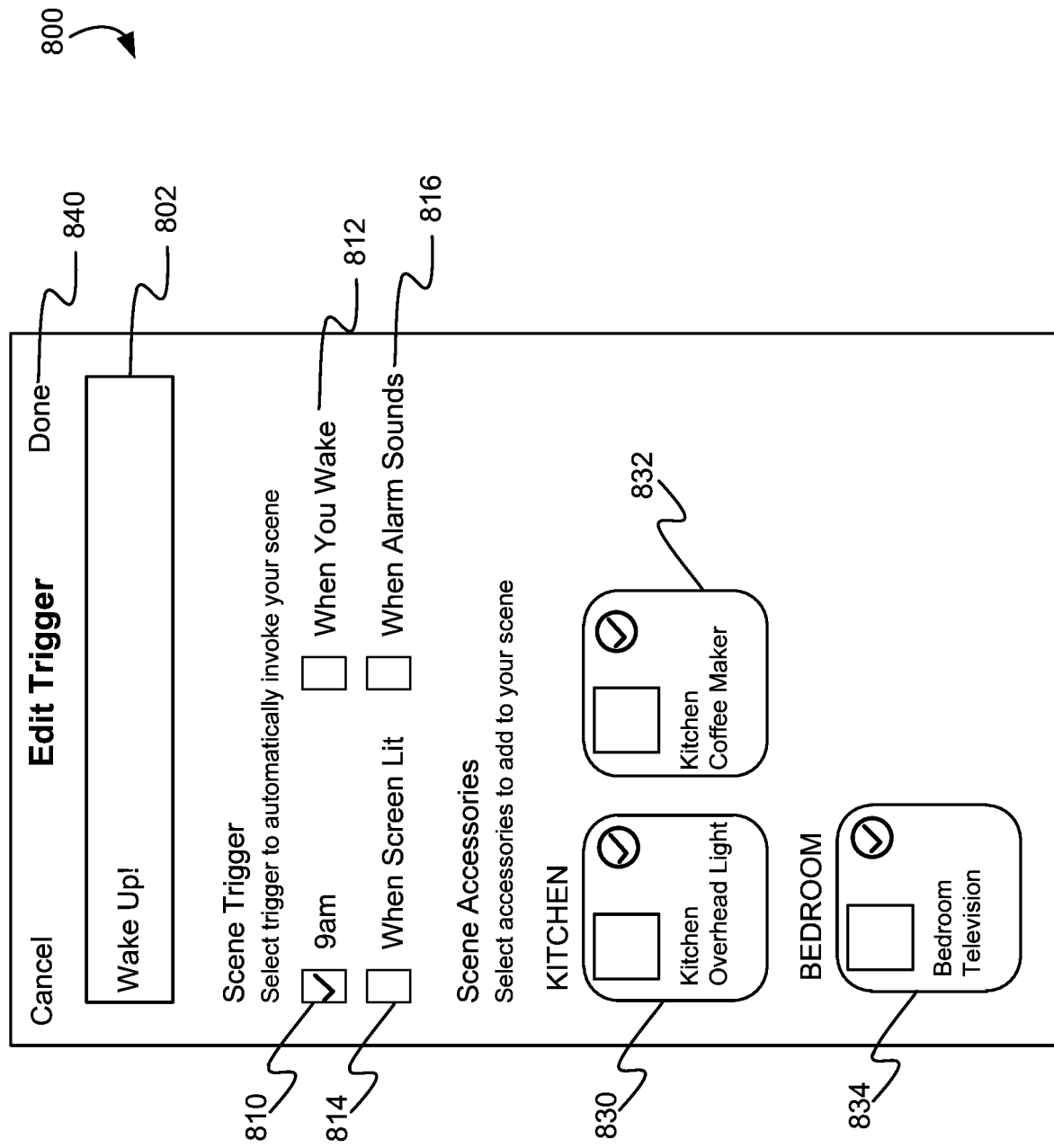
FIG. 8 illustrates an example graphical user interface for presenting details about a scene trigger.

FIG. 8 illustrates an example graphical user interface 800 for presenting details about a scene trigger. For example, GUI 800 can be presented by home application 304 in response to receiving a user selection of graphical element 614 of GUI 600. GUI 800 can present similar information and graphical elements as GUI 700. However, GUI 800 can also present trigger event information and/or selectable options so that the user can view and/or edit the events that will automatically invoke the corresponding scene.

In some implementations, GUI 800 can include graphical element 802 (e.g., a text input box, a text control, etc.) for specifying a name for the selected scene trigger. For example, the user can provide input to a virtual keyboard (not shown) to edit the name of the suggested scene trigger. For example, the suggested scene trigger may be automatically named by home application 304 and/or home daemon 345 initially. The user can provide input to graphical element 802 to rename the scene trigger.

In some implementations, GUI 800 can include scene trigger options. For example, GUI 800 can include scene trigger options 810-816. For example, scene trigger options scene trigger options 810-816 can be automatically determined by home application 304 and/or home daemon 345 based on historical accessory state change data and/or historical event data (e.g., context data), as described above. Home application 304 can, for example, automatically determine multiple potential trigger events based on the relatedness algorithms described above. Home application 304 can select the most probable trigger event (e.g., the trigger event that occurs in the historical data the most number of times) as the trigger for the suggested scene trigger. For example, if the historical accessory state data and historical event data show that the user is more likely to invoke the "Wake Up!" scene (or adjust the corresponding accessories) at 9 am than in response to other events (e.g., when screen on user's device is lit, when the user wakes, when the user's alarm sounds, etc.), then home application 304 will automatically select option 810 as the scene trigger, as indicated by FIG. 8.

In some implementations, home application 304 can configure a scene with multiple triggers. For example, while home application 304 can suggest a time-based scene trigger (e.g., 9 am, option 810) based on historical accessory state change information and context information, home application 304 can present other (e.g., additional) scene triggers that meet the trigger confidence threshold described above. Thus, if there are four different triggers that meet or exceed the confidence threshold for triggers, home application 304 can present all four scene trigger options 810-816 on GUI 800.

When home application 304 presents multiple trigger options, the user can select multiple triggers to cause home application 304 to automatically invoke the corresponding scene. For example, the time-based trigger option 810 can be automatically selected by home application 304. The user activity-based trigger option 812 (e.g., the user wakes from sleeping) can be selected by the user instead of or in addition to the automatically selected trigger option 810. The user may select an accessory state-based trigger option 816 that causes home application 304 to invoke the corresponding scene when the specified accessory state change (e.g., an alarm triggered) is detected. When multiple triggers are selected, home application 304 can invoke the corresponding scene the first time a selected trigger is detected within a period of time (e.g., 24 hours). When multiple triggers are selected, home application 304 can invoke the corresponding scene every time a selected trigger is detected.

In some implementations, GUI 800 can include graphical elements 830-834 representing accessories managed by home application 304. For example, graphical elements 830-834 can represent accessories selected for the presented scene and/or scene trigger. When the scene is invoked, home application 304 can automatically adjust the state of the accessories corresponding to graphical elements 830-834, as described above.

Figure 9:
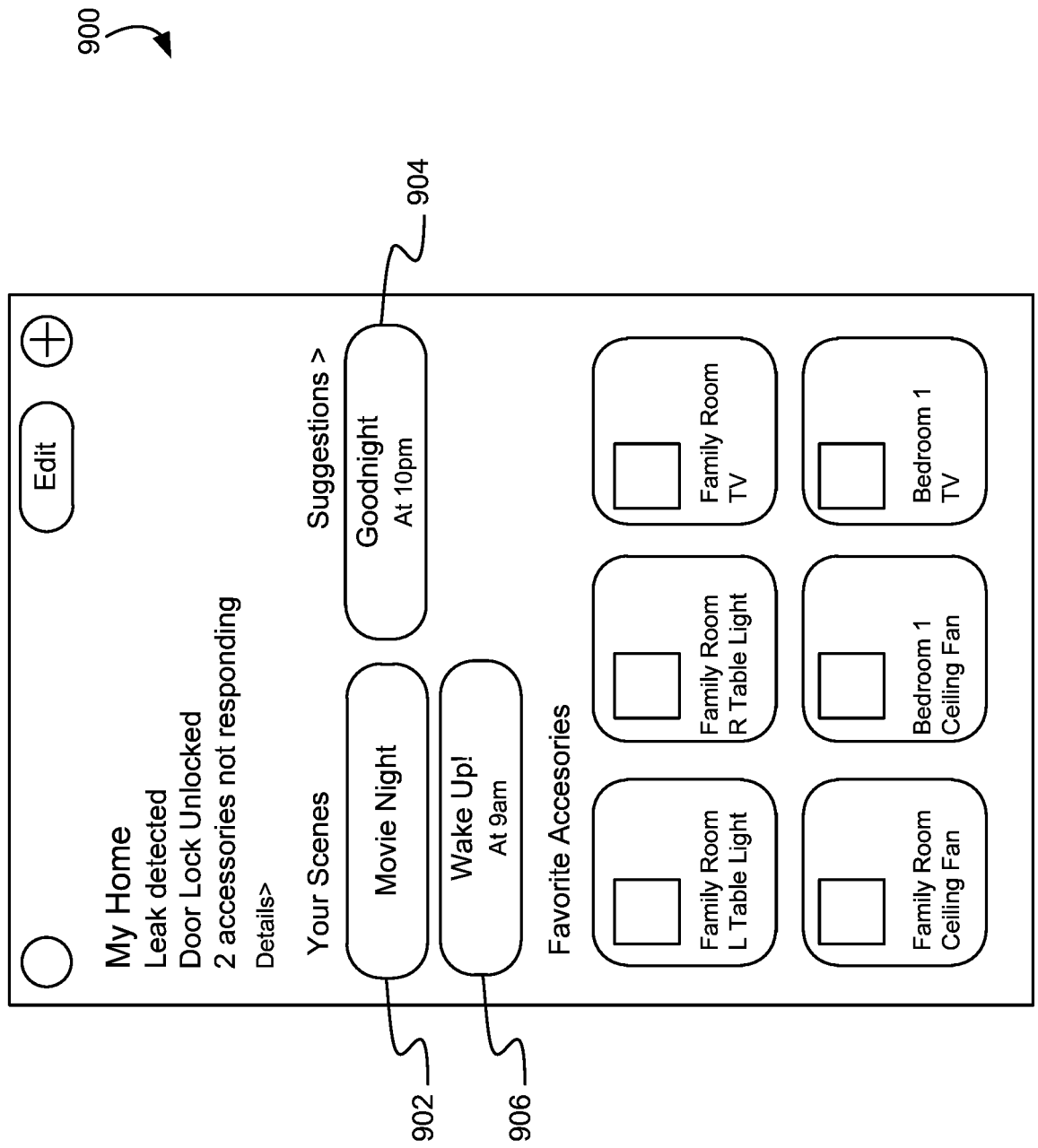
FIG. 9 illustrates an example graphical user interface for presenting user approved scene suggestions and triggers.

FIG. 9 illustrates an example graphical user interface 900 for presenting user approved scene suggestions and triggers. For example, GUI 900 can correspond to GUI 500 of FIG. 5. However, in FIG. 9, the user has accepted or approved of some scene suggestions that are now presented on GUI 900.

In some implementations, FIG. 9 includes graphical elements 902-906 representing scene suggestions and/or scene trigger suggestions that the user has accepted. For example, graphical element 902 can correspond to a "Movie Night" scene. Graphical element 904 can correspond to a "Goodnight" scene trigger. For example, both graphical elements 902 and 904 can correspond to scenes. The user can select graphical element 902 and/or graphical element 904 to invoke the corresponding scene. However, because graphical element 904 includes a scene trigger, graphical element 904 can present information describing the trigger (e.g. "at 10 pm") for the scene that will cause home application 304 to automatically invoke the corresponding scene "Goodnight" at 10 pm.

Figure 10:
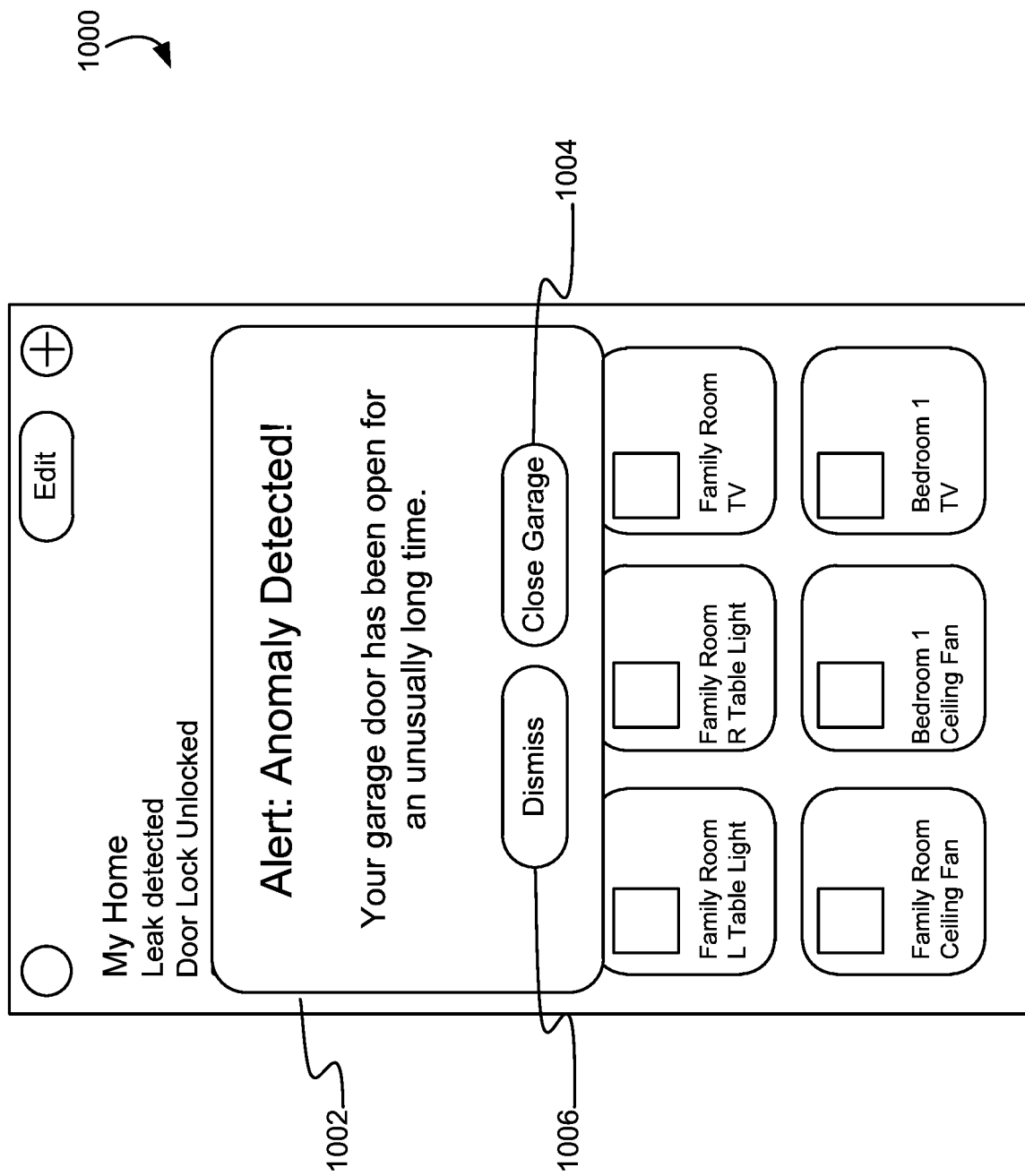
FIG. 10 illustrates an example graphical user interface for presenting anomalous accessory state data.

FIG. 10 illustrates an example graphical user interface 1000 for presenting anomalous accessory state data. For example, GUI 100 can be presented by home application 304 in response to home application 304 and/or home daemon 345 detecting an anomalous accessory state. For example, an anomalous accessory state can be detected when a current accessory state (e.g., given a current context, other accessory states, etc.) does not correspond to an expected accessory state. Home application 304 can determine the expected accessory state similarly to determining scene suggestions and/or scene trigger suggestions, as described above. For example, home application 304 can analyze historical accessory state change data and/or context data using the relatedness algorithm (e.g., a priori) algorithm described above to determine related accessories, accessory states, and/or contexts. Home application 304 can detect patterns in the historical accessory state data and/or context data that represent normal states, activities, behaviors, etc., with respect to accessories and contexts. Home application 304 can detect when the current activity, accessory states, and/or contexts do not comport with normal activities, states, and/or contexts and present a notification to the user to draw the user's attention to the anomalous accessory state.

For example, using the relatedness algorithm, home application 304 can determine that when the garage door is opened (e.g., change in accessory state), it is usually opened at 6 pm (e.g., context) and stays open for 5 minutes (e.g., context derived from open and close events). When home application 304 determines that the garage door has been opened for 10 minutes, home application 304 can present a notification 1002 indicating that the garage door has been open for longer than the expected amount of time. In other words, the expected state of the garage door after 5 minutes of being open is the 'closed' state and since the garage door is still open, the garage door is in an anomalous state based on the historical data.

As another example, home application 304 and/or home daemon 345 can determine based on historical accessory state data and/or context data, that the oven and/or stove is never turned on when there are no people (e.g., based on the presence or absence of their respective devices) in the home environment. As described above, home daemon 345 can determine that the people who live in the home environment have left the home environment, detect that the stove and/or oven are turned on, and determine, based on historical data, that the 'on' state of the stove or oven is not a normal state when there are no people in the home environment. When home daemon 345 determines that the current state (e.g., 'on') of the oven or stove is not the expected state of the oven or stove for the current context (e.g., everyone is out of the house), home daemon 345 can send a notification to home application 304 to cause home application 304 to present notification 1002 on user device 302.

As yet another example, home application 304 can determine anomalous accessory states based on a missing event. For example, home application can determine that the front door lock is usually unlocked around 3 pm when children arrive home from school. If home application 304 determines or detects that the front door lock is locked around 3 pm, home application 304 can monitor the locked state of the front door for a period of time (e.g., 15 minutes, 20 minutes, etc.) and generate an anomaly notification if the front door lock remains locked. Thus, the parents of the children can be notified of a situation that may prevent their children from entering the home after school.

In some implementations, home daemon 345 can determine anomalous accessory states based on a probability that the accessory state would occur at a particular time. For example, home daemon 345 can determine, based on historical accessory state data, the probability that an accessory would have a particular state at a particular time. For example, home daemon 345 can divide a 24 hour period into 5 minute timeslots. For each timeslot, home daemon 345 can determine the probability (e.g., using well known prediction methods) that an accessory would have a particular state. For example, home daemon 345 can determine the probability that the front door lock would be unlocked. Home daemon 345 can determine the probability that the garage door would be open. Home daemon 345 can determine the probability that the oven would be on. If home daemon 345 determines that the current state of an accessory has a very low probability (e.g., lower than some threshold value) of occurring in the current timeslot, then home daemon 345 can detect an anomalous accessory state and send a notification to user device 302 indicating the anomalous accessory state.

In some implementations, home application 304 and/or home daemon 345 can determine exceptions to anomaly determinations. For example, home daemon 345 can determine a shift in accessory state change patterns that indicate a time shift in user behavior. For example, home daemon 345 can determine that the current state of some accessories is not the expected state of those accessories at the current time, as described above. However, home daemon 345 can determine that the accessory states correspond to a scene that is typically invoked earlier (or later) in the day. Home daemon 345 can recognize the pattern of current accessory states and determine that the pattern has merely shifted from the typically earlier time to a later time and is, therefore, not an anomaly.

In some implementations, home daemon 345 can determine anomaly exceptions based on contextual information received from user device 302. For example, home daemon 345 can receive calendar data, maps data, motion data, location data, etc., from user device 302. Home daemon 345 can detect an anomaly, such as the garage door being open at a strange time. Home daemon 345 can compare the time of anomalous accessory state to calendar data that indicates a late meeting, maps data that shows the user was just driving home, and/or location data indicating that the user was away from the house and is now home. Based on this contextual data, home daemon 345 can determine that the anomalous accessory state corresponds to the user coming home and is not, in fact, an anomaly.

In some implementations, notification 1002 can describe an anomaly detected by home application 304 and/or home daemon 345. For example, when the user has left the garage open for an unusually long time, notification 1002 can present a message that describes the anomaly.

In some implementations, notification 1002 can include graphical element 1004 for returning the accessory to the normal accessory state. For example, when notification 1002 indicates that the user has left the garage open for an unusually long time, notification 1002 can present graphical element 1002 that when selected by the user, causes the home application 304 to cause garage door opener (e.g., the accessory) to close the garage door. Thus, the accessory can be put back into the normal state for the current time and/or context. If the user does not wish to change the anomalous state of the accessory, the user can select graphical element 1006 to hide or dismiss notification 1002.

Example Processes

Figure 11:
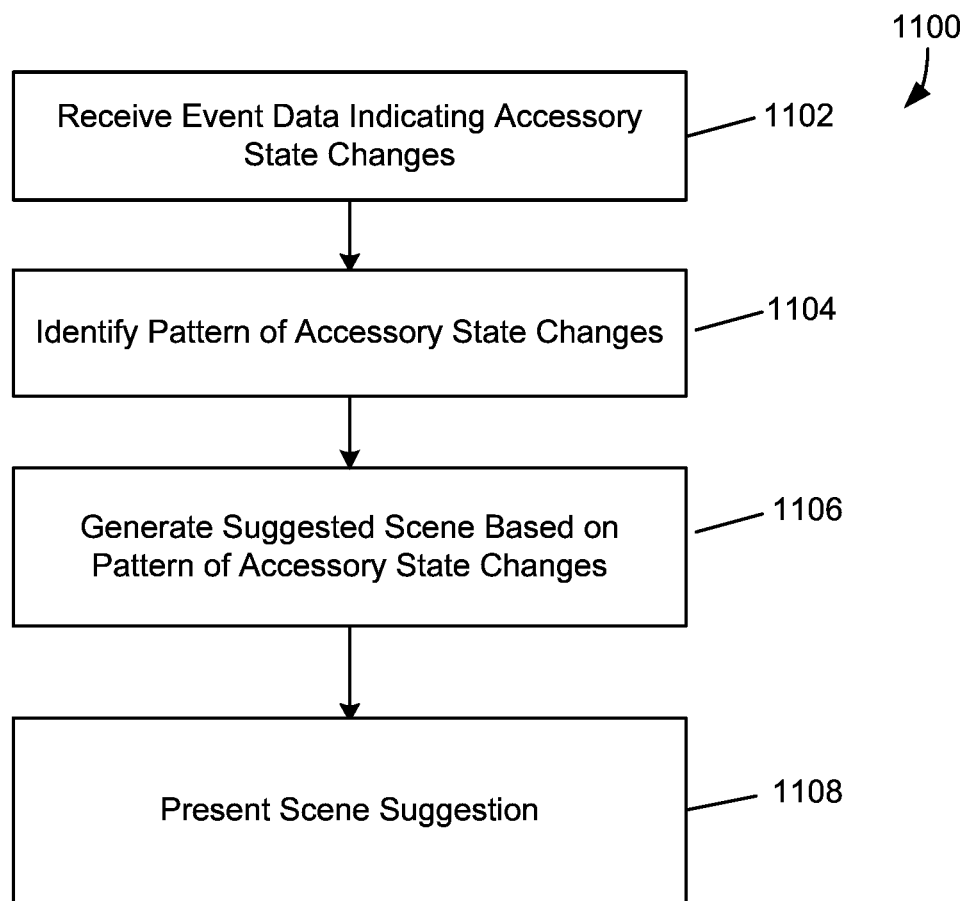
FIG. 11 is a flow diagram of an example process for generating scene suggestions.

FIG. 11 is a flow diagram of an example process 1100 for generating scene suggestions. For example, home application 304 and/or home daemon 305 on user device 302 can perform process 1100 to generate scene suggestions based on historical accessory state change data collected by home application 304 and/or home daemon 305. In some implementations, home daemon 345 on resident device 340 can perform process 1100 to generate scene suggestions based on historical accessory state change data received from accessories and other user devices. To simplify the description of process 1100, the process will be described in terms of steps being performed by user device 302. However, resident device 340 can perform the steps of process 1100 described below and send the scene suggestions to user device 302 so that user device 302 can present the scene suggestions to the user.

At step 1102, user device 302 can receive accessory event data indicating accessory state changes. For example, home application 304 and/or home daemon 305 can receive accessory state change event data from accessories in home environment 400. When accessories change state (e.g., light is turned on/off, lock is locked/unlocked, garage is opened/closed, etc.), the accessories can report their respective states to home application 304 and/or home daemon 305 running on user device 302. Home application 304 and/or home daemon 305 can store the accessory state change event data in accessory state database 308. For example, the accessory state change event data can include an accessory identifier, a user identifier identifying the user who initiated the state change, a device identifier for the user device that caused the state change, the new device state, a timestamp indicating when the state change occurred, and/or a home environment identifier indicating to which home environment the accessory is connected. Home application 304 and/or home daemon 305 can collect accessory state change event data over time and generate a historical record of accessory state change event data in database 308.

At step 1104, user device 302 can identify a pattern of accessory state changes that indicates a relationship between accessories. For example, home application 304 and/or home daemon 305 can periodically analyze the historical accessory state change event data in database 308 to determine which accessories and/or accessory states are associated or related to each other.

In some implementations, the accessories can be related based on time. For example, accessories that frequently change state at about the same time may be related based on use. Accessories that are adjusted by a user at about the same time may be adjusted to create an environment (e.g., a scene) for some sort of user activity, such as movie watching, sleeping, working, exercising, etc. Home application 304 and/or home daemon 305 can perform a relatedness algorithm (e.g., modified a priori algorithm, shopping cart algorithm, etc.) to determine the relatedness of the accessories and/or accessory states, as described above. The relatedness algorithm can be performed to determine a pattern of use or a pattern of accessory state changes over time that indicates that a group of accessories and/or accessory states are related and recur over time.

At step 1106, user device 302 can generate a suggested scene based on the identified pattern of accessory state changes. For example, a scene can include accessories and respective accessory states determined by the relatedness algorithm described above. The scene can be invoked to cause the state of the accessories associated with the scene to change to the respective states specified by the scene for each accessory. A scene can be generated based on a group of accessories that is related and has been determined by home application 304 and/or home daemon 305 to frequently recur, as determined by the historical accessory state change event data stored in database 308. At this point, since the scene has not been accepted or approved by the user, the scene is just a suggestion and not yet available for invocation by the user or execution by user device 302.

At step 1108, user device 302 can present the scene suggestion on a display of user device 302. For example, home daemon 305/345 can send the suggested scene to home application 304. Home application 304 can present the suggested scene on a GUI of home application 304, as described above. Home application 304 can receive user input indicating that the user wishes to accept or reject the scene suggestion. When the user accepts the scene suggestion, the scene can be invoked by the user and executed by home application 304. When the user rejects the scene suggestion, home application 304 can hide the scene and prevent the user from invoking the scene in the future.

Figure 12:
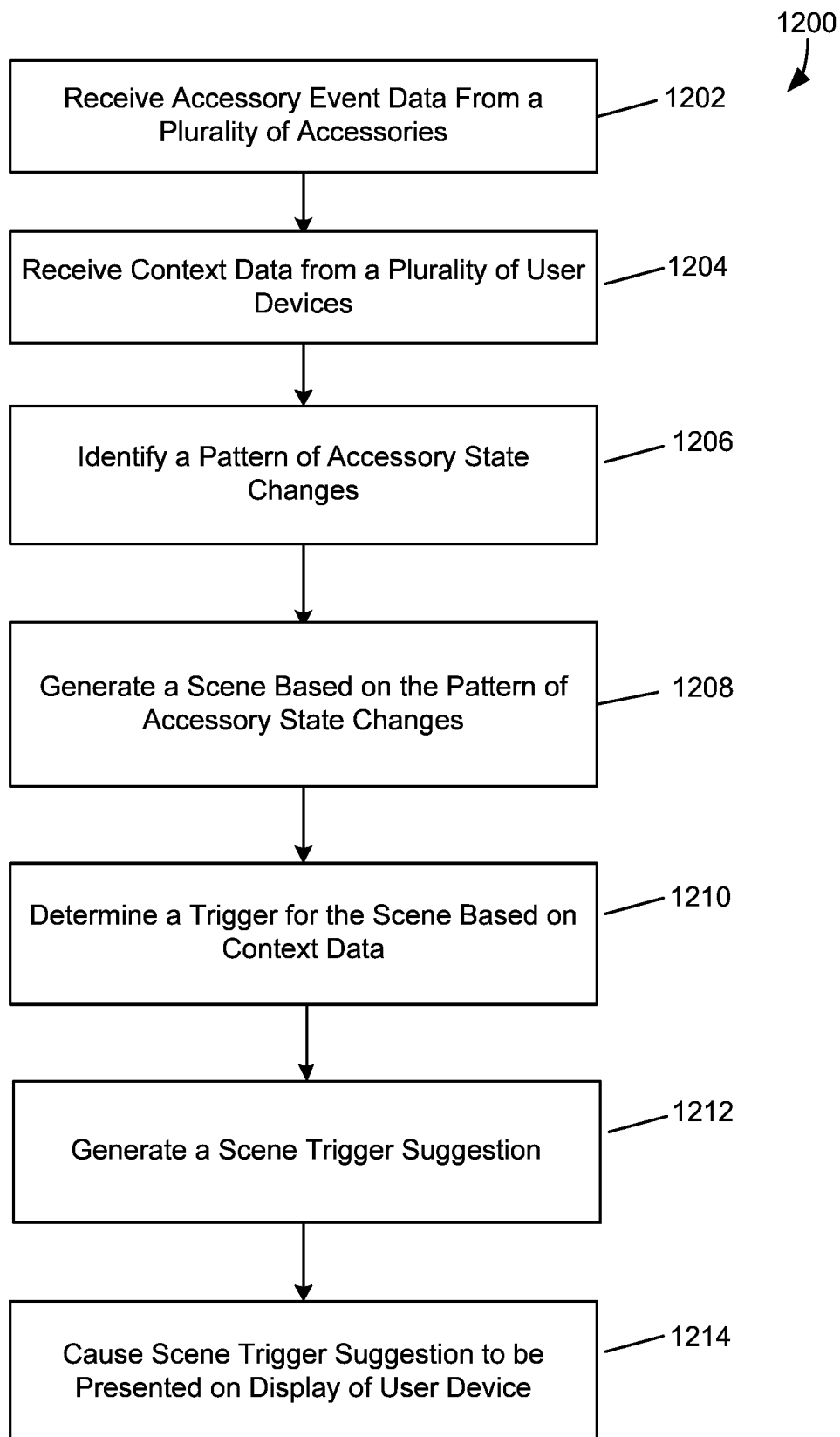
FIG. 12 is a flow diagram of an example process for generating scene trigger suggestions.

FIG. 12 is a flow diagram of an example process 1200 for generating scene trigger suggestions. For example, home application 304 and/or home daemon 305 on user device 302 can perform process 1200 to generate scene trigger suggestions based on historical accessory state change data and/or context data collected by home application 304 and/or home daemon 305. In some implementations, home daemon 345 on resident device 340 can perform process 1200 to generate scene trigger suggestions based on historical accessory state change data and/or context data received from accessories and other user devices. To simplify the description of process 1200, the process will be described in terms of steps being performed by resident device 340. However, user device 302 can perform similar steps as user device 302 described below.

At step 1202, resident device 340 can receive accessory event data from a plurality of accessories. For example, resident device 340 can be a user device (e.g., user device 302) that always, or almost always, stays within home environment 400. Since resident device 340 is more consistently, if not constantly, connected to the accessories within home environment 400, home daemon 345 can collect a more comprehensive amount of accessory state change event data over time and store the accessory state change event data in accessory state database 348.

At step 1204, resident device 340 can receive context data from a plurality of user devices. For example, as a coordinator device (e.g., coordinator 210), resident device 340 can collect context data from user devices (e.g., user device 302) that enter home environment 400. User device 302 can, for example, send context data that includes location data, user activity data, calendar data, map data, motion data, and other types of state data generated or collected by the sensors and/or software of user device 302 to home daemon 345. Home daemon 345 can store the context data in accessory state database 348. The context data can include a user identifier identifying the user who is associated with the device, a device identifier for the user device, the context data, and/or a timestamp indicating when the context data was determined or detected.

At step 1206, resident device 340 can identify a pattern of accessory state changes that indicates a relationship between accessories. For example, home daemon 345 can periodically analyze the historical accessory state change event data in database 348 to determine which accessories and/or accessory states are associated or related to each other.

In some implementations, the accessories can be related based on time. For example, accessories that frequently change state at about the same time may be related based on use. Accessories that are adjusted by a user at about the same time may be adjusted to create an environment (e.g., a scene) for some sort of user activity, such as movie watching, sleeping, working, exercising, etc. Home daemon 345 can perform a relatedness algorithm (e.g., modified a priori algorithm, shopping cart algorithm, etc.) to determine the relatedness of the accessories and/or accessory states, as described above. The relatedness algorithm can be performed to determine a pattern of use or a pattern of accessory state changes over time that indicates that a group of accessories and/or accessory states are related and recur over time.

At step 1208, resident device 340 can generate a scene based on the pattern of accessory state changes. For example, a scene can include accessories and respective accessory states determined by the relatedness algorithm described above. The scene can be invoked to cause the state of the accessories associated with the scene to change to the respective states specified by the scene for each accessory. A scene can be generated based on a group of accessories that is related and has been determined by home daemon 345 to frequently recur, as determined by the historical accessory state change event data stored in database 308. At this point, since the scene has not been accepted or approved by the user, the scene is just a suggestion and not yet available for invocation by the user or execution by user device 302.

At step 1210, resident device 340 can determine a trigger for the scene based on context data. For example, home daemon 345 can analyze the context data in database 348 to determine a time based trigger, location based trigger, event based trigger, or some other context trigger. Home daemon 345 can analyze the context data using the relatedness algorithm described above. For example, in this case, the relatedness algorithm (e.g., the a priori algorithm, shopping cart algorithm, etc.) can take into account accessory states and context when determining a trigger for the scene.

At step 1212, resident device 340 can generate a scene trigger suggestion. For example, home daemon 345 can generate a scene trigger that includes the determined scene and the determined trigger condition or context. As described above, the scene can be configured with accessories and corresponding accessory states such that, when the scene is invoked, the invoking device (e.g., user device 302) sends commands to each of the accessories to cause the accessories to transition to their respective accessory states. The trigger condition can be a context that precedes or follows the invocation of the scene. The scene trigger can be used to configure home application 304 on user device 302 to automatically invoke the corresponding scene or change the state of an individual accessory. At this point, since the scene trigger has not been accepted or approved by the user, the scene trigger is just a suggestion and not yet available for execution by user device 302.

At step 1214, resident device 340 can cause the scene trigger suggestion to be presented on a display of user device 302. For example, after generating the trigger suggestion, home daemon 345 can send the scene trigger suggestion to home application 304 on user device 302. When the scene trigger suggestion is received, home application 304 can present the scene trigger suggestion on a GUI of home application 304, as described above.

Figure 13:
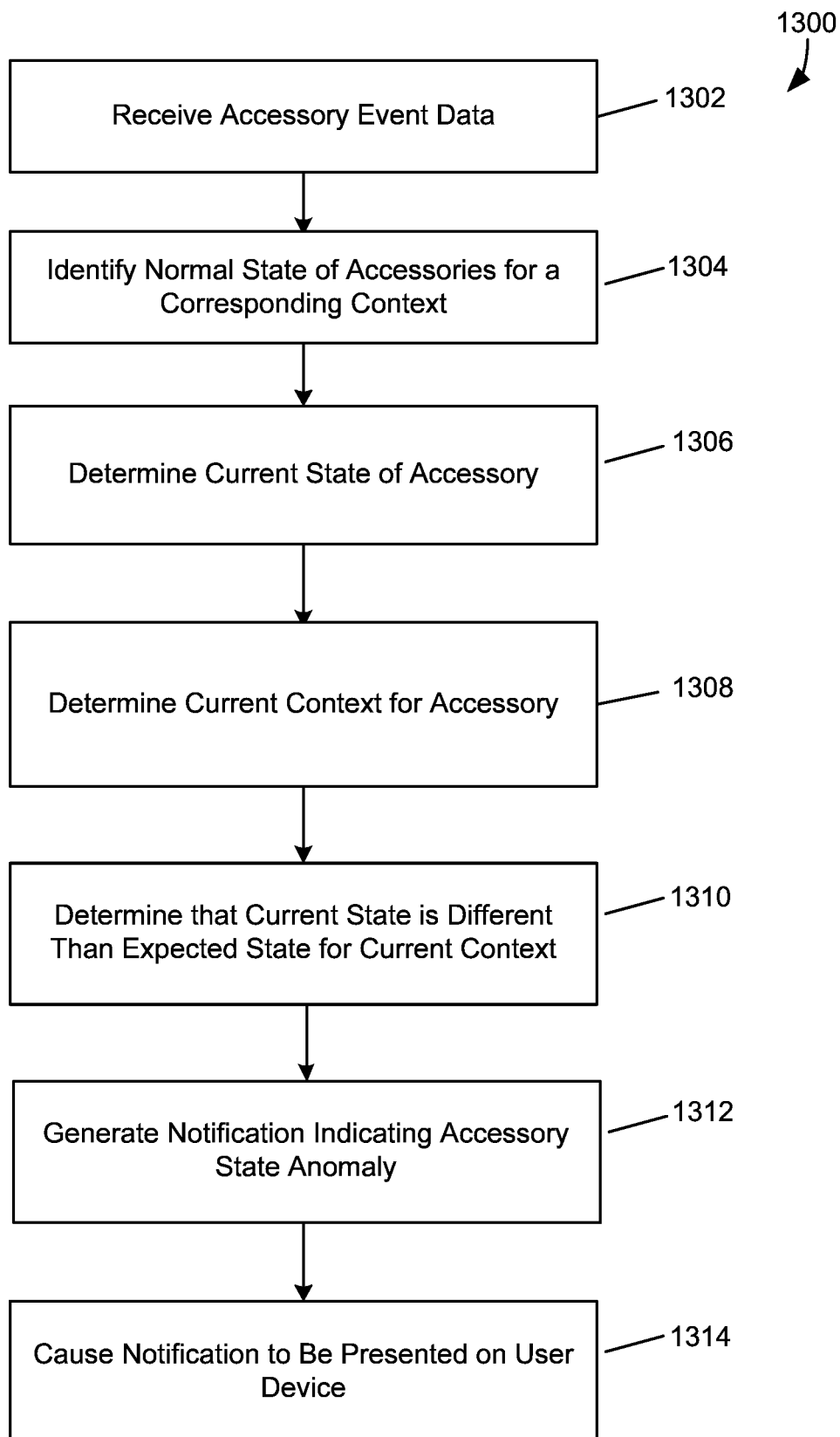
FIG. 13 is a flow diagram of an example process for determining accessory state anomalies.

FIG. 13 is a flow diagram of an example process 1300 for determining accessory state anomalies. For example, home application 304 and/or home daemon 305 on user device 302 can perform process 1300 to determine accessory state anomalies based on historical accessory state change data and/or context data collected by home application 304 and/or home daemon 305. In some implementations, home daemon 345 on resident device 340 can perform process 1200 to determine accessory state anomalies based on historical accessory state change data and/or context data received from accessories and other user devices. When home daemon 345 determines accessory state anomalies, home daemon 345 can send a notification describing the anomalies to home application 304 on user device 302.

Home application 304 can then present a graphical notification describing the accessory state anomaly on a display of user device 302.

At step 1302, user device 302 can receive accessory event data indicating accessory state changes. For example, home application 304 and/or home daemon 305 can receive accessory state change event data from accessories in home environment 400. When accessories change state (e.g., light is turned on/off, lock is locked/unlocked, garage is opened/closed, etc.), the accessories can report their respective states to home application 304 and/or home daemon 305 running on user device 302. Home application 304 and/or home daemon 305 can store the accessory state change event data in accessory state database 308. For example, the accessory state change event data can include an accessory identifier, a user identifier identifying the user who initiated the state change, a device identifier for the user device that caused the state change, the new device state, a timestamp indicating when the state change occurred, and/or a home environment identifier indicating to which home environment the accessory is connected. Home application 304 and/or home daemon 305 can collect accessory state change event data over time and generate a historical record of accessory state change event data in database 308.

At step 1304, user device 302 can identify the normal state of accessories for a corresponding context. For example, home application 304 and/or home daemon 305 can analyze historical accessory state change event data stored in accessory state database 308 to determine what the normal (e.g., usual, typical, most likely, most probable, etc.) state is for each accessory in a particular context. For example, the context can be a time of day. The context can be the number of people (e.g., as indicated by user devices) in the home environment. The context can be location of user devices in or outside of the home environment, or any other context as may be described herein. For example, home daemon 305 can determine that the normal state of the garage door at 2 pm is closed. Home daemon 305 can determine that the normal state of the front door lock at 1am is locked. Home daemon 305 can determine that the normal state of the oven when nobody is home is off.

At step 1306, user device 302 can determine the current state of an accessory. As described above at step 1302, home application 304 and/or home daemon 305 receive accessory state change event data indicating the states of various accessories as they change state. Since this state change event data is stored in database 308, home daemon 305 can obtain the current state of the accessory from database 308.

At step 1308, user device 302 can determine the current operating context for an accessory. For example, home daemon 305 can determine the location of user devices with respect to the home environment. Home daemon 305 can determine the current time. Home daemon 305 can determine that a particular event just occurred.

At step 1310, user device 302 can determine that the current state is different than the expected state for the current context. For example, home daemon 305 can determine that the current context is 1am and the front door lock is unlocked instead of being locked as is expected at 1am. Home daemon 305 can determine that the current context is 2 pm and the garage door is open instead of being closed as is expected at 2 pm. Home daemon 305 can determine that the current context is that all personal user devices are outside of the home environment and the oven is turned on instead of being turned off as is expected when everyone is outside of the home environment.

In some implementations, home daemon 305 can determine whether an anomalous accessory state falls into an exception that would indicate that the anomalous accessory state is not anomalous. For example, home daemon 305 can determine that a normal accessory state has shifted later in the day when home daemon 305 determines that the user woke up later than normal. Home daemon 305 can determine that the normal accessory state has shifted when other related accessory states have been shifted at the same time as the anomalous accessory state. Thus, a group of anomalous accessory states independently or in combination with a change in user behavior can be used by home daemon 305 to identify an exception that would make an anomalous accessory state normal.

At step 1312, user device 302 can generate a notification indicating the determined accessory state anomaly. For example, home daemon 305 can generate a notification or a message that describes the anomalous accessory state. Home daemon 305 can send the notification or message to home application 304 to cause home application 304 to present a graphical notification that includes a description of the anomalous accessory state on a display of user device 302.

In some implementations, home application 304 can detect duration based anomalies using timers. For example, home application 304 can determine that the normal duration for the front door lock to be unlocked is 5 minutes. When a user or user device unlocks the front door, home application 304 can set a timer for the expected duration of the unlocked state (e.g., 5 minutes). Alternatively, home application 304 can set a time for the expected duration of the unlocked state plus some padding for flexibility (e.g., 5 minutes+2 minutes). When the timer expires, home application 304 can determine the current state front door lock. If the front door lock is still unlocked, home application 304 can present a notification describing the anomalous front door lock state to the user, as described above.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers, smart phones, and wearable devices (e.g., a smart watch, smart glasses, etc.). One or more of these electronic devices can include a touch-sensitive surface and/or pressure sensitive surface. The touch-sensitive surface can process multiple simultaneous points of input, including processing data related to the pressure, degree or position of each point of input. Such processing can facilitate gestures with multiple fingers, including pinching and swiping. Such processing can facilitate distinguishing types of inputs based on length of touch and pressure applied so that different responses, operations, and/or features can be provided based on the type of touch input. Thus, a tap, long touch, and pressure touch can all be interpreted as different types of input to illicit different types of responses from the computing devices described herein.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architectures

Figure 14:
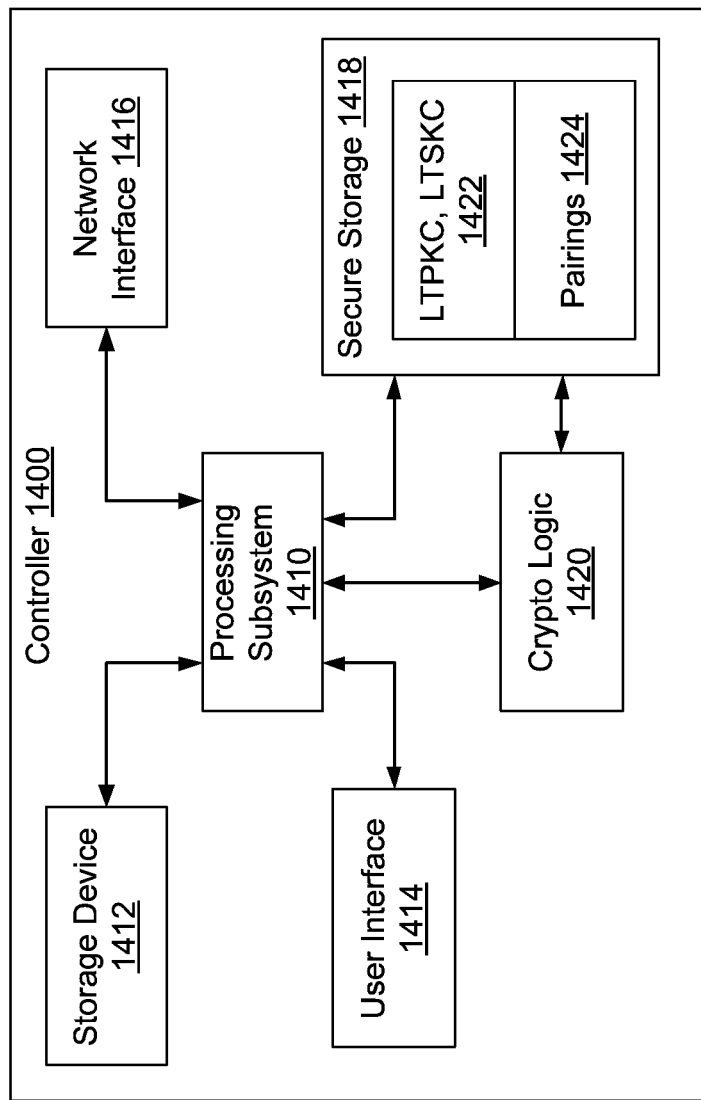
FIG. 14 shows a simplified block diagram of an example system architecture for controller.

FIG. 14 shows a simplified block diagram of an example system architecture for controller 1400. Controller 1400 can implement any or all of the controller functions, behaviors, and capabilities described herein, as well as other functions, behaviors, and capabilities not expressly described. Controller 1400 can include processing subsystem 1410, storage device 1412, user interface 1414, communication interface 1416, secure storage module 1418, and cryptographic logic module 1420. Controller 1400 can also include other components (not explicitly shown) such as a battery, power controllers, and other components operable to provide various enhanced capabilities. In various embodiments, controller 1400 can be implemented in a desktop computer, laptop computer, tablet computer, smart phone, other mobile phone, wearable computing device, or other systems having any desired form factor. Further, as noted above, controller 1400 can be implemented partly in a base station and partly in a mobile unit that communicates with the base station and provides a user interface.

Storage device 1412 can be implemented, e.g., using disk, flash memory, or any other non-transitory storage medium, or a combination of media, and can include volatile and/or non-volatile media. In some embodiments, storage device 1412 can store one or more application and/or operating system programs to be executed by processing subsystem 1410, including programs to implement various operations described above as being performed by a controller. For example, storage device 1412 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 1412 can also store apps designed for specific accessories or specific categories of accessories (e.g., an IP camera app to manage an IP camera accessory or a security app to interact with door lock accessories). Storage device 1412 can also store other data produced or used by controller 1400 in the course of its operations, including trigger data objects and/or other data pertaining to an environment model.

User interface 1414 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1414 to invoke the functionality of controller 1400 and can view and/or hear output from controller 1400 via output devices of user interface 1414.

Processing subsystem 1410 can be implemented as one or more integrated circuits, e.g., one or more single-core or multi-core microprocessors or microcontrollers, examples of which are known in the art. In operation, processing system 1410 can control the operation of controller 1400. In various embodiments, processing subsystem 1410 can execute a variety of programs in response to program code and can maintain multiple concurrently executing programs or processes. At any given time, some or all of the program code to be executed can be resident in processing subsystem 1410 and/or in storage media such as storage device 1412.

Through suitable programming, processing subsystem 1410 can provide various functionality for controller 1400. For example, in some embodiments, processing subsystem 1410 can implement various processes (or portions thereof) described above as being implemented by a controller. Processing subsystem 1410 can also execute other programs to control other functions of controller 1400, including application programs that may be stored in storage device 1412. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 1416 can provide voice and/or data communication capability for controller 1400. In some embodiments communication interface 1416 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1416 can provide wired network connectivity (e.g., Ethernet) in addition to or instead of a wireless interface. Communication interface 1416 can be implemented using a combination of hardware (e.g., driver circuits, antennas, modulators/demodulators, encoders/decoders, and other analog and/or digital signal processing circuits) and software components. In some embodiments, communication interface 1416 can support multiple communication channels concurrently or at different times, using the same transport or different transports.

Secure storage module 1418 can be an integrated circuit or the like that can securely store cryptographic information for controller 1400. Examples of information that can be stored within secure storage module 1418 include the controller's long-term public and secret keys 1422 (LTPKC, LTSKC as described above), and a list of paired accessories 1424 (e.g., a lookup table that maps accessory ID to accessory long-term public key LTPKA for accessories that have completed a pair setup or pair add process as described above).

In some embodiments, cryptographic operations can be implemented in a cryptographic logic module 1420 that communicates with secure storage module 1418. Physically, cryptographic logic module 1420 can be implemented in the same integrated circuit with secure storage module 1418 or a different integrated circuit (e.g., a processor in processing subsystem 1410) as desired. Cryptographic logic module 1420 can include various logic circuits (fixed or programmable as desired) that implement or support cryptographic operations of controller 1400, including any or all cryptographic operations described above. Secure storage module 1418 and/or cryptographic logic module 1420 can appear as a "black box" to the rest of controller 1400. Thus, for instance, communication interface 1416 can receive a message in encrypted form that it cannot decrypt and can simply deliver the message to processing subsystem 1410. Processing subsystem 1410 may also be unable to decrypt the message, but it can recognize the message as encrypted and deliver it to cryptographic logic module 1420. Cryptographic logic module 1420 can decrypt the message (e.g., using information extracted from secure storage module 1418) and determine what information to return to processing subsystem 1410. As a result, certain information can be available only within secure storage module 1418 and cryptographic logic module 1420. If secure storage module 1418 and cryptographic logic module 1420 are implemented on a single integrated circuit that executes code only from an internal secure repository, this can make extraction of the information extremely difficult, which can provide a high degree of security. Other implementations are also possible.

Figure 15:
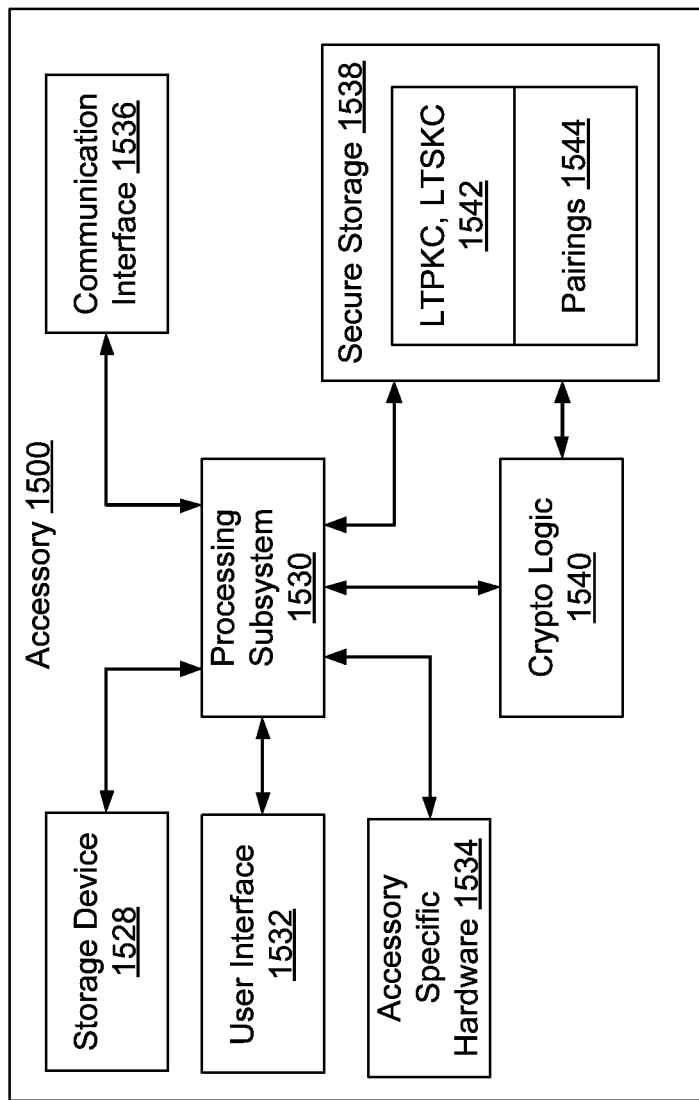
FIG. 15 shows a simplified block diagram of an example system architecture for accessory.

FIG. 15 shows a simplified block diagram of an example system architecture for accessory 1500. Accessory 1500 can implement any or all of the accessory functions, behaviors, and capabilities described herein, as well as other functions, behaviors, and capabilities not expressly described. Accessory 1500 can include storage device 1528, processing subsystem 1530, user interface 1532, accessory-specific hardware 1514, communication interface 1536, secure storage module 1538, and cryptographic logic module 1540. Accessory 1500 can also include other components (not explicitly shown) such as a battery, power controllers, and other components operable to provide various enhanced capabilities.

Accessory 1500 is representative of a broad class of accessories that can be operated by a controller such as controller 1400, and such accessories can vary widely in capability, complexity, and form factor. Various accessories may include components not explicitly shown in FIG. 15, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1528 can be implemented, e.g., using disk, flash memory, or any other non-transitory storage medium, or a combination of media, and can include volatile and/or non-volatile media. In some embodiments, storage device 1528 can store one or more programs (e.g., firmware) to be executed by processing subsystem 1530, including programs to implement various operations described above as being performed by an accessory, as well as operations related to particular accessory behaviors. Storage device 1528 can also store an accessory object or accessory definition record that can be furnished to controller devices, e.g., during device discovery as described in above-referenced U.S. application Ser. No. 14/614,914. Storage device 1528 can also store accessory state information and any other data that may be used during operation of accessory 1500.

Processing subsystem 1530 can include, e.g., one or more single-core or multi-core microprocessors and/or microcontrollers executing program code to perform various functions associated with accessory 1500. For example, processing subsystem 1530 can implement various processes (or portions thereof) described above as being implemented by an accessory, e.g., by executing program code stored in storage device 1528. Processing subsystem 1530 can also execute other programs to control other functions of accessory 1500. In some instances programs executed by processing subsystem 1530 can interact with a controller (e.g., controller 1400), e.g., by generating messages to be sent to the controller and/or receiving messages from the controller.

User interface 1532 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1500, a user can operate input devices of user interface 1532 to invoke functionality of accessory 1500 and can view and/or hear output from accessory 1500 via output devices of user interface 1532. Some accessories may provide a minimal user interface or no user interface. at all. Where the accessory does not have a user interface, a user can still interact with the accessory using a controller (e.g., controller 1400).

Accessory-specific hardware 1534 can include any other components that may be present in accessory 1500 to enable its functionality. For example, in various embodiments accessory-specific hardware 1534 can include one or more storage devices using fixed or removable storage media; GPS receiver; power supply and/or power management circuitry; a camera; a microphone; one or more actuators;

control switches; environmental sensors (e.g., temperature sensor, pressure sensor, accelerometer, chemical sensor, etc.); and so on. It is to be understood that any type of accessory functionality can be supported by providing appropriate accessory-specific hardware 1534 and that accessory-specific hardware can include mechanical as well as electrical or electronic components.

Communication interface 1536 can provide voice and/or data communication capability for accessory 1500. In some embodiments communication interface 1536 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1536 can provide wired network connectivity (e.g., Ethernet) in addition to or instead of a wireless interface. Communication interface 1536 can be implemented using a combination of hardware (e.g., driver circuits, antennas, modulators/demodulators, encoders/decoders, and other analog and/or digital signal processing circuits) and software components. In some embodiments, communication interface 1536 can support multiple communication channels concurrently or at different times, using the same transport or different transports.

Secure storage module 1538 can be an integrated circuit or the like that can securely store cryptographic information for accessory 1500. Examples of information that can be stored within secure storage module 1538 include the accessory's long-term public and secret keys 1542 (LTPKA, LTSKA as described above), and a list of paired controllers 1544 (e.g., a lookup table that maps controller ID to controller long-term public key LTPKC for controllers that have completed a pair setup or pair add process as described above). In some embodiments, secure storage module 1538 can be omitted; keys and lists of paired controllers can be stored in storage device 1528.

In some embodiments, cryptographic operations can be implemented in a cryptographic logic module 1540 that communicates with secure storage module 1538. Physically, cryptographic logic module 1540 can be implemented in the same integrated circuit with secure storage module 1538 or a different integrated circuit (e.g., a processor in processing subsystem 1530) as desired. Cryptographic logic module 1540 can include various logic circuits (fixed or programmable as desired) that implement or support cryptographic operations of accessory 1500, including any or all cryptographic operations described above. Secure storage module 1538 and/or cryptographic logic module 1540 can appear as a "black box" to the rest of accessory 1500. Thus, for instance, communication interface 1536 can receive a message in encrypted form that it cannot decrypt and can simply deliver the message to processing subsystem 1530. Processing subsystem 1530 may also be unable to decrypt the message, but it can recognize the message as encrypted and deliver it to cryptographic logic module 1540. Cryptographic logic module 1540 can decrypt the message (e.g., using information extracted from secure storage module 1538) and determine what information to return to processing subsystem 1530. As a result, certain information can be available only within secure storage module 1538 and cryptographic logic module 1540. If secure storage module 1538 and cryptographic logic module 1540 are implemented on a single integrated circuit that executes code only from an internal secure repository, this can make extraction of the information extremely difficult, which can provide a high degree of security. Other implementations are also possible.

Accessory 1500 can be any electronic apparatus that interacts with controller 1400. In some embodiments, controller 1400 can provide remote control over operations of accessory 1500 as described above. For example controller 1400 can provide a remote user interface for accessory 1500 that can include both input and output controls (e.g., a display screen to display current status information obtained from accessory 1500 and an input control such as a touchscreen overlay to allow changes to the status information). Controller 1400 in various embodiments can control any function of accessory 1500 and can also receive data from accessory 1500.

It will be appreciated that the system configurations and components described herein are illustrative and that variations and modifications are possible. It is to be understood that an implementation of controller 1400 can perform all operations described above as being performed by a controller and that an implementation of accessory 1500 can perform any or all operations described above as being performed by an accessory. A proxy, bridge, tunnel, or coordinator can combine components of controller 1400 and accessory 1500, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present technologies described herein can be realized in a variety of apparatus including electronic devices implemented using any combination of circuitry and software.

Further Embodiments

While the technologies described herein have been described with respect to specific embodiments, one skilled in the art will recognize that numerous modifications are possible. Controller networks and/or accessory networks can include as many or as few devices as desired. Use of a proxy or coordinator is not required; regardless of the number of accessories or number of controllers, it is always possible (at least in principle) to establish pairings between each controller and each accessory and to have all controllers operate by controlling accessories directly. Where an accessory-network model (e.g., an environment model) is provided, each controller can obtain a copy of the model (e.g., via synchronization) and can provide access to the model through its user interface.

Further, where proxies or controllers are present, it can be but need not be the case that all controllers are permitted to access all accessories via the proxy or controller. Some controllers might be restricted from accessing accessories when not within the local environment, and some accessories might require that controllers access them directly rather than through a proxy or coordinator.

Embodiments of the present technologies described herein can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present technologies described herein may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the technologies described herein have been described with respect to specific embodiments, it will be appreciated that the disclosure is intended to cover all modifications and equivalents within the scope of the following claims.

What is claimed is:

1. A method comprising:
   receiving, by a resident device, accessory event data that indicates accessory state changes occurring at a plurality of accessory devices;
   based at least in part on the event data, identifying, by the resident device, a pattern of accessory state changes that indicate an expected state for an accessory in a corresponding context;
   automatically generating, by the resident device, a plurality of scenes that include at least a subset of the plurality of accessory devices based at least in part on the pattern of accessory state changes, wherein the plurality of scenes are invoked, states of the subset of the plurality of accessory devices are automatically adjusted;
   determining, by the resident device, a current state of the accessory;
   determining, by the resident device, a current context for the accessory;
   determining, by the resident device, whether the current state of the accessory is different from the expected state of the accessory for the current context; and
   in accordance with a determination that the current state of the accessory is different from the expected state of the accessory for the current context:
      generating, by the resident device, an accessory state anomaly notification that indicates the current state of the accessory is unexpected for the current context;
      determining, by the resident device, whether the accessory and the current state of the accessory are part of a scene of the plurality of scenes, wherein the scene has been invoked at a time of a day;
      in accordance with a determination that the accessory and the current state of the accessory are not part of the scene:
         sending, by the resident device, the accessory state anomaly notification to at least one user device of a plurality of different user devices; and
      in accordance with a determination that the accessory and the current state of the accessory are part of the scene, wherein the resident device recognizes a pattern of the current state of the accessory and determines that the pattern is shifted from the time of the day to a different time;
         preventing, by the resident device, the accessory state anomaly notification from being sent.

2. The method of claim 1, wherein the pattern of accessory state changes includes an expected duration of the expected state in the corresponding context; and further comprising:
   determining, by the resident device, a current duration of the current state of the accessory;
   determining, by the resident device, that the current state of the accessory is different from the expected state of the accessory for the current context when the current duration of the current accessory state exceeds the expected duration of the expected state.

3. The method of claim 1, wherein receiving, by the resident device, the accessory event data includes receiving the accessory event data from the at least one user device, where the at least one user device is distinct from the resident device.

4. The method of claim 1, wherein determining, by the resident device, whether the current state of the accessory is different from the expected state of the accessory for the current context includes determining that the current context corresponds to an expected context and determining that the current state is different from the expected state.

5. The method of claim 1, wherein, in accordance with a determination that the current state of the accessory is not different from the expected state of the accessory for the current context: determining whether the current context is different from an expected context.

6. The method of claim 1, wherein the accessory state anomaly notification sent to the at least one user device comprises a graphical element configured to enable selection of a return state element; and
   further comprising:
      receiving, from the at least one user device, an indication of selection, at the at least one user device, of the return state element; and
      sending an instruction to the accessory to return to the expected state for the current context based at least in part on the indication of the selection of the return state element.

7. A non-transitory computer readable medium including one or more sequences of instructions that, when executed by one or more processors, cause:

receiving, by a resident device, accessory event data that indicates accessory state changes occurring at a plurality of accessory devices;

based at least in part on the event data, identifying, by the resident device, a pattern of accessory state changes that indicate an expected state for an accessory in a corresponding context;

automatically generating, by the resident device, a plurality of scenes that include at least a subset of the plurality of accessory devices based at least in part on the pattern of accessory state changes, wherein when the plurality of scenes are invoked, states of the subset of the plurality of accessory devices are automatically adjusted;

determining, by the resident device, a current state of the accessory;

determining, by the resident device, a current context for the accessory;

determining, by the resident device, whether the current state of the accessory is different from the expected state of the accessory for the current context; and in accordance with a determination that the current state of the accessory is different from the expected state of the accessory for the current context:

generating, by the resident device, an accessory state anomaly notification that indicates the current state of the accessory is unexpected for the current context;

determining, by the resident device, whether the accessory and the current state of the accessory are part of a scene of the plurality of scenes, wherein the scene has been invoked at a time of a day;

in accordance with a determination that the accessory and the current state of the accessory are not part of the scene:

sending, by the resident device, the accessory state anomaly notification to at least one user device of a plurality of different user devices; and in accordance with a determination that the accessory and the current state of the accessory are part of the scene, wherein the resident device recognizes a pattern of the current state of the accessory and determines that the pattern is shifted from the time of the day to a different time:

preventing, by the resident device, the accessory state anomaly notification from being sent.

8. The non-transitory computer readable medium of claim 7, wherein the pattern of accessory state changes includes an expected duration of the expected state in the corresponding context; and wherein the instructions cause:

determining, by the resident device, a current duration of the current state of the accessory;

determining, by the resident device, that the current state of the accessory is different from the expected state of the accessory for the current context when the current duration of the current accessory state exceeds the expected duration of the expected state.

9. The non-transitory computer readable medium of claim 7, wherein the instructions that cause receiving, by the resident device, the accessory event data include instructions that cause receiving the accessory event data from the at least one user device, where the at least one user device is distinct from the resident device.

10. The non-transitory computer readable medium of claim 7, wherein the instructions that cause determining, by the resident device, whether the current state of the accessory is different from the expected state of the accessory for the current context include instructions that cause determining that the current context corresponds to an expected context and determining that the current state is different from the expected state.

11. The non-transitory computer readable medium of claim 7, wherein, in accordance with a determination that the current state of the accessory is not different from the expected state of the accessory for the current context: determining whether the current context is different from an expected context.

12. A system comprising:

one or more processors; and a non-transitory computer readable medium including one or more sequences of instructions that, when executed by the one or more processors, cause:

receiving, by a resident device, accessory event data that indicates accessory state changes occurring at a plurality of accessory devices;

based at least in part on the event data, identifying, by the resident device, a pattern of accessory state changes that indicate an expected state for an accessory in a corresponding context;

automatically generating, by the resident device, a plurality of scenes that include at least a subset of the plurality of accessory devices based at least in part on the pattern of accessory state changes, wherein when the plurality of scenes are invoked, states of the subset of the plurality of accessory devices are automatically adjusted;

determining, by the resident device, a current state of the accessory;

determining, by the resident device, a current context for the accessory;

determining, by the resident device, whether the current state of the accessory is different from the expected state of the accessory for the current context;

generating, by the resident device, an accessory state anomaly notification that indicates the current state of the accessory is unexpected for the current context;

determining, by the resident device, whether the accessory and the current state of the accessory are part of a scene of the plurality of scenes, wherein the scene has been invoked at a time of a day;

in accordance with a determination that the accessory and the current state of the accessory are not part of the scene:

sending, by the resident device, the accessory state anomaly notification to at least one user device of a plurality of different user devices; and in accordance with a determination that the accessory and the current state of the accessory are part of the scene, wherein the resident device recognizes a pattern of the current state of the accessory and determines that the pattern is shifted from the time of the day to a different time:

preventing, by the resident device, the accessory state anomaly notification from being sent.

13. The system of claim 12, wherein the pattern of accessory state changes includes an expected duration of the expected state in the corresponding context; and wherein the instructions cause:

determining, by the resident device, a current duration of the current state of the accessory;

determining, by the resident device, that the current state of the accessory is different from the expected state of the accessory for the current context when the current duration of the current accessory state exceeds the expected duration of the expected state.

14. The system of claim 12, wherein the instructions that cause receiving, by the resident device, the accessory event data include instructions that cause receiving the accessory event data from the at least one user device, where the at least one user device is distinct from the resident device.

15. The system of claim 12, wherein the instructions that cause determining, by the resident device, whether the current state of the accessory is different from the expected state of the accessory for the current context include instructions that cause determining that the current context corresponds to an expected context and determining that the current state is different from the expected state.

16. The system of claim 12, wherein, in accordance with a determination that the current state of the accessory is not different from the expected state of the accessory for the current context: determining whether the current context is different from an expected context.

\* \* \* \* \*